United States Patent
Nushiro et al.

(10) Patent No.: US 10,240,053 B2
(45) Date of Patent: Mar. 26, 2019

(54) AQUEOUS INK, INK CARTRIDGE, AND INK JET RECORDING METHOD

(71) Applicant: CANON KABUSHIKI KAISHA, Tokyo (JP)

(72) Inventors: Kazuya Nushiro, Ichikawa (JP); Takashi Saito, Kawasaki (JP); Yukako Tamanuki, Tokyo (JP); Hiroshi Kakikawa, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/915,225

(22) Filed: Mar. 8, 2018

(65) Prior Publication Data

US 2018/0273786 A1    Sep. 27, 2018

(30) Foreign Application Priority Data

Mar. 24, 2017 (JP) .................... 2017-058409
Feb. 13, 2018 (JP) .................... 2018-022727

(51) Int. Cl.
*C09D 11/00* (2014.01)
*C09D 11/328* (2014.01)
(Continued)

(52) U.S. Cl.
CPC .......... *C09D 11/328* (2013.01); *B41J 2/17513* (2013.01); *B41J 2/17553* (2013.01);
(Continued)

(58) Field of Classification Search
USPC .............. 106/31.47, 31.48, 22 K; 347/106
See application file for complete search history.

(56) References Cited

U.S. PATENT DOCUMENTS 5,178,671 A    1/1993 Yamamoto et al.
5,423,906 A *  6/1995 Gregory .............. C09B 35/461
                                          106/31.48
(Continued)

FOREIGN PATENT DOCUMENTS

EP    0 443 386 A2    8/1991
JP    H03-294366 A    12/1991
(Continued)

OTHER PUBLICATIONS

Jul. 12, 2018 extended European Search Report in European Patent Appln. No. 18161672.3.

*Primary Examiner* — Lam S Nguyen
(74) *Attorney, Agent, or Firm* — Venable LLP

(57) ABSTRACT

An aqueous ink for ink jet having a high color developing property, capable of recording an image having an excellent hue, and having excellent storage stability, containing a coloring material and a water-soluble organic solvent is provided. The coloring material is a compound represented by the following General Formula (1). The water-soluble organic solvent contains a first water-soluble organic solvent having two or more hydroxy groups and having a Log P value of −1.88 or more to −1.09 or less. The content (mass (Continued)

%) of the first water-soluble organic solvent is 5.0 times or more to 30.0 times or less by a mass ratio with respect the content (mass %) of the coloring material.

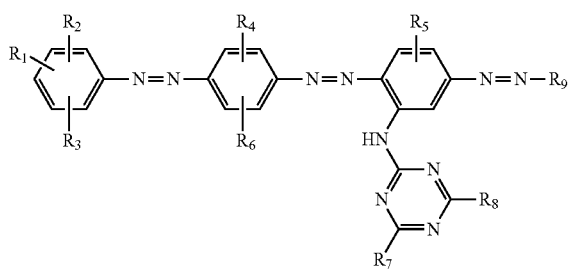

(1)

7 Claims, 2 Drawing Sheets

(51) Int. Cl.
*B41J 2/175* (2006.01)
*B41M 5/00* (2006.01)
*C09D 11/033* (2014.01)
*C09D 11/037* (2014.01)

(52) U.S. Cl.
CPC ......... *B41M 5/0023* (2013.01); *C09D 11/033* (2013.01); *C09D 11/037* (2013.01)

(56) References Cited

U.S. PATENT DOCUMENTS

| | | | | |
|---|---|---|---|---|
| 5,686,951 | A * | 11/1997 | Koike | B41M 1/14 347/100 |
| 5,948,154 | A * | 9/1999 | Hayashi | B41J 2/01 106/31.47 |
| 8,167,991 | B2 | 5/2012 | Matsui et al. | |
| 8,814,341 | B2 | 8/2014 | Nagao et al. | |
| 8,932,393 | B2 | 1/2015 | Yoshimoto et al. | |
| 9,453,138 | B2 | 9/2016 | Shimizu et al. | |
| 2009/0062545 | A1 | 3/2009 | Matsui et al. | |
| 2013/0321523 | A1 | 12/2013 | Yoshimoto et al. | |
| 2013/0335490 | A1 * | 12/2013 | Nagao | C09D 11/328 347/86 |

FOREIGN PATENT DOCUMENTS

| | | |
|---|---|---|
| JP | H07-150088 A | 6/1995 |
| JP | 2002-275380 A | 9/2002 |
| JP | 2017-061633 A | 3/2017 |
| WO | 02/074865 A1 | 9/2002 |
| WO | 2007/077931 A1 | 7/2007 |
| WO | 2012/081640 A1 | 6/2012 |
| WO | 2017/051923 A1 | 3/2017 |

\* cited by examiner

AQUEOUS INK, INK CARTRIDGE, AND INK JET RECORDING METHOD

BACKGROUND OF THE INVENTION

Field of the Invention

The present invention relates to an aqueous ink, an ink cartridge, and an ink jet recording method.

Description of the Related Art

An ink jet recording method is a recording method in which an image is recorded by applying small droplets of an ink to a recording medium, and is rapidly becoming popular due to lowering of the price and improvement of the recording velocity. In general, a recorded product obtained by an ink jet recording method has lower stiffness of an image thereof than that in a silver halide photograph. Specifically, when a recorded product is exposed to light, humidity, heat, or an environmental gas such as an ozone gas present in the air for a long time, there are problems that a coloring material in the recorded product is deteriorated, and thus color tone change or color fading of an image easily occurs, and the like. Specifically, since a color tone change in an image recorded by an ink (a black ink) containing a black coloring material is easily visualized, improvement of not only color developing property but also stiffness such as humidity resistance is required.

Regarding a black coloring material, molecular structures for improving color developing property and stiffness have been considered. For example, there is a suggestion to aim at improving stiffness by using a compound having a nitrogen-containing hetero ring in an ink (see Japanese Patent Application Laid-Open Nos. H03-294366, H07-150088 and 2002-275380, and International Publication No. WO2007/077931). Furthermore, there is a suggestion to aim at improving color developing property by using a compound having a tetrakisazo structure in an ink (see International Publication No. WO2012/081640).

However, as a result of the consideration of the present inventors, it was found that a balance between a color developing property and a hue was insufficient in images recorded by using inks using the technologies suggested by Japanese Patent Application Laid-Open Nos. H03-294366, H07-150088 and 2002-275380, and International Publication Nos. WO2007/077931 and WO2012/081640. In order to obtain a black image having an excellent color developing property and an excellent hue, it is necessary that a black coloring material for use in an ink has a high absorption spectrum at a region of 550 nm or more in a recorded image.

The compound described in Japanese Patent Application Laid-Open No. H03-294366 has a trisazo structure and thus has the maximum absorption wavelength in an image of around 530 nm, and it is conjectured that the color developing property of an image was low since the absorption at the long wavelength side was insufficient.

Furthermore, conventional black coloring materials had a problem that the materials tend to have yellow to reddish hues by making a devise for increasing stiffness. The compounds described in Japanese Patent Application Laid-Open Nos. H07-150088 and 2002-275380 and International Publication No. WO2007/077931 are such that a triazine ring that extends a conjugate chain is introduced as a substituent in an azo backbone, and the absorption spectrum of each compound has a long wavelength in accordance with this introduction, and thus the image hue has been improved to be greenish. However, as a result of the consideration by the present inventors, it was found that the color developing property of the recorded image was insufficient in the inks using the compounds suggested in Japanese Patent Application Laid-Open Nos. H07-150088 and 2002-275380 and International Publication No. WO2007/077931. This is because the compounds suggested in Japanese Patent Application Laid-Open Nos. H07-150088 and 2002-275380 and International Publication No. WO2007/077931 had a naphthalene ring, which has low polarity, as a substituent, and thus it is conjectured that the compounds easily permeated in a recording medium and sank into a deep portion in the recording medium, and caused lowering of the color developing property.

Since the compound described in International Publication No. WO2012/081640 has a tetrakisazo structure, the conjugate system has extended more than in the compound described in Japanese Patent Application Laid-Open No. H03-294366, and the maximum absorption wavelength has shifted to a longer wavelength side at around 570 nm in an image. When this compound was used in an ink and the ink was evaluated, improvement was seen in the color developing property, whereas the hue was reddish despite that the compound was a black coloring material, and thus the hue was insufficient.

Therefore, the present inventors have found that an image having an excellent color developing property and an excellent hue can be obtained by using, as a coloring material, a compound in which a triazine ring is introduced as a substituent into a trisazo compound or a tetrakisazo compound, which is a compound having an aromatic ring containing heteroatoms (a heterocyclic aromatic ring). However, it has been clarified during the process of the consideration that the storage stability of the ink is lowered due to use of the above-mentioned compound as a coloring material.

SUMMARY OF THE INVENTION

The object of the present invention is to provide an aqueous ink having a high color developing property, capable of recording an image having an excellent hue, and having excellent storage stability. Furthermore, another object of the present invention is to provide an ink cartridge and an ink jet recording method using the above-mentioned ink.

The above-mentioned objects are achieved by the following present invention. That is, according to the present invention, there is provided an aqueous ink for ink jet including a coloring material and a water-soluble organic solvent, wherein the coloring material is a compound represented by the following General Formula (1), the water-soluble organic solvent contains a first water-soluble organic solvent having two or more hydroxy groups and having a Log P value of −1.88 or more to −1.09 or less, and the content (mass %) of the first water-soluble organic solvent is 5.0 times or more to 30.0 times or less by a mass ratio with respect the content (mass %) of the coloring material.

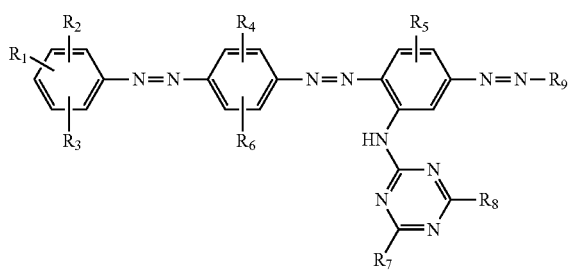

(1)

In General Formula (1), $R_1$, $R_2$ and $R_3$ each independently represent a hydrogen atom; a carboxylic acid group; a sulfonic acid group; a hydroxy group; an acetylamino group; a halogen atom; a cyano group; a nitro group; a sulfamoyl group; an alkyl group having 1 to 4 carbon atom(s); an alkoxy group having 1 to 4 carbon atom(s); an alkoxy group having 1 to 4 carbon atom(s) substituted by at least one kind of group(s) selected from the group consisting of a hydroxy group, an alkoxy group having 1 to 4 carbon atom(s), a sulfonic acid group, and a carboxylic acid group; an alkylsulfonyl group having 1 to 4 carbon atom(s); or an alkylsulfonyl group having 1 to 4 carbon atom(s) substituted by at least one kind of group(s) selected from the group consisting of a hydroxy group, a sulfonic acid group, and a carboxylic acid group. $R_4$ and $R_5$ each independently represent an alkylthio group having 1 to 4 carbon atom(s); an alkylthio group having 1 to 4 carbon atom(s) substituted by at least one kind of group(s) selected from the group consisting of a hydroxy group, a sulfonic acid group, and a carboxylic acid group; an alkoxy group having 1 to 4 carbon atom(s); or an alkoxy group having 1 to 4 carbon atom(s) substituted by at least one kind of group(s) selected from the group consisting of a hydroxy group, a sulfonic acid group, and a carboxylic acid group. $R_6$ represents a hydrogen atom; a carboxylic acid group; a sulfonic acid group; an alkylcarbonylamino group having 1 to 4 carbon atom(s); a halogen atom; an alkyl group having 1 to 4 carbon atom(s); an alkoxy group having 1 to 4 carbon atom(s); or an alkoxy group having 1 to 4 carbon atom(s) substituted by at least one kind of group(s) selected from the group consisting of a hydroxy group, an alkoxy group having 1 to 4 carbon atom(s), a sulfonic acid group, and a carboxylic acid group. $R_7$ represents an anilino group or a naphthylamino group substituted with a sulfonic acid group, and $R_7$ may further have at least one kind of substituent(s) selected from the group consisting of: a sulfonic acid group; a carboxylic acid group; a phosphoric acid group; a sulfamoyl group; a carbamoyl group; a hydroxy group; an alkoxy group having 1 to 6 carbon atom(s); an amino group; a mono- or di-alkylamino group having 1 to 6 carbon atom(s); a mono- or di-arylamino group; an acetylamino group; an ureido group; an alkyl group having 1 to 6 carbon atom(s); a nitro group; a cyano group; a halogen atom; an alkylsulfonyl group having 1 to 6 carbon atom(s); and an alkylthio group having 1 to 6 carbon atom(s). $R_8$ represents an anilino group; a naphthylamino group; a mono- or di-alkylamino group having 1 to 6 carbon atom(s); a mono- or di-arylamino group; an amino group; an alkylthio group having 1 to 6 carbon atom(s); a phenylthio group; a phenoxy group; an alkoxy group having 1 to 6 carbon atom(s); or a hydroxy group; and $R_8$ may further have at least one kind of substituent(s) selected from the group consisting of: a sulfonic acid group; a carboxylic acid group; a phosphoric acid group; a sulfamoyl group; a carbamoyl group; a hydroxy group; an alkoxy group having 1 to 6 carbon atom(s); an amino group; a mono- or di-alkylamino group having 1 to 6 carbon atom(s); a mono- or di-arylamino group; an acetylamino group; an ureido group; an alkyl group having 1 to 6 carbon atom(s); a nitro group; a cyano group; a halogen atom; an alkylsulfonyl group having 1 to 6 carbon atom(s); and an alkylthio group having 1 to 6 carbon atom(s). $R_9$ represents a heterocyclic aromatic ring, or an aromatic ring to which a heterocyclic aromatic ring is bonded via an azo group, and these rings may have at least one kind of substituent(s) selected from the group consisting of: an alkyl group having 1 to 4 carbon atom(s); a sulfonic acid group; a carboxylic acid group; a phosphoric acid group; a sulfamoyl group; a carbamoyl group; a hydroxy group; an alkoxy group having 1 to 4 carbon atom(s); an alkoxy group having 1 to 4 carbon atom(s) substituted with a sulfonic acid group; a cyano group; an amino group; and an alkylcarbonylamino group having 1 to 4 carbon atom(s).

Further features of the present invention will become apparent from the following description of exemplary embodiments with reference to the attached drawings.

DESCRIPTION OF THE EMBODIMENTS

Figure 1:
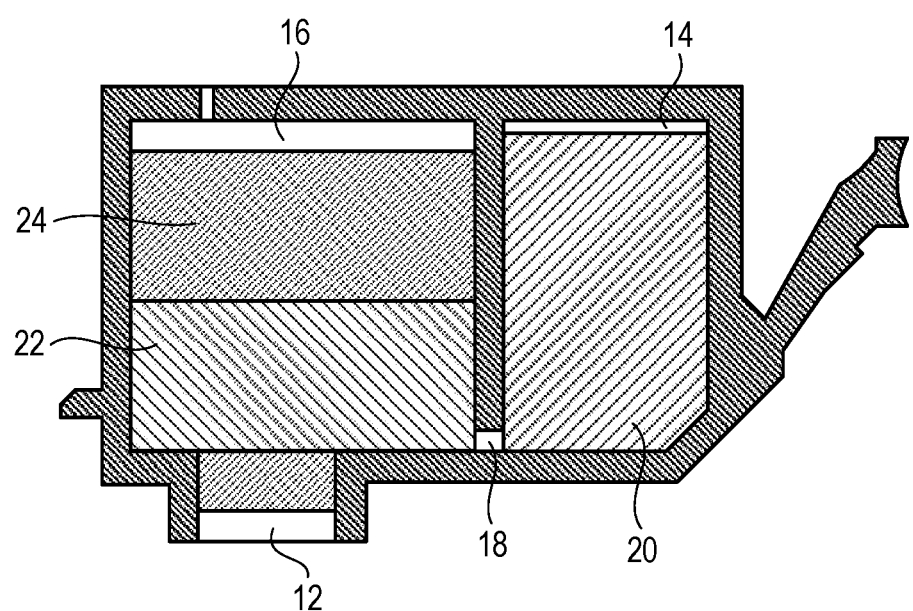
FIG. 1 is a cross-sectional drawing schematically showing an ink cartridge according to an embodiment of the present invention.

Preferred embodiments of the present invention will now be described in detail with referring to preferable embodiments. In the present invention, in a case where the compound is a salt, the salt is present as an ionized form in an ink, but the present invention is expressed as "containing a salt" for the sake of convenience. Furthermore, an aqueous ink for ink jet is sometimes simply referred to as "ink". The physical property values are specifically values at an ordinary temperature (25° C.) unless otherwise stated.

Furthermore, in the present invention, a solvent that is a solid at an ordinary temperature (25° C.) is deemed to be encompassed in the water-soluble organic solvent as long as it can be a solvent that can dissolve or disperse components such as a coloring material in a case where the solvent is dissolved in water to form an aqueous solution.

It is considered that the molecular structure of a black coloring material and the optical density of an image have the following relationships. In general, an image having a low light reflectance in the visible light region (generally 380 nm or more to 830 nm or less) has a high optical density, and thus is easily recognized. Furthermore, as shown in the "Standard Photopic Vision Spectroscopy Vision Efficiency Curve" defined by CIE (Commission internationale de l'eclairage), the wavelength that humans feel the brightest, i.e., the wavelength at which humans feel the lowest optical density, is around 555 nm. Accordingly, in order to increase an optical density of an image, it is important to use a black coloring material having a low light reflectance specifically at around 555 nm in the visible light region in an image, i.e., having a high absorbing property at around 555 nm in an image.

The compound represented by General Formula (1) used as a coloring material to be incorporated in an ink has a trisazo structure or a tetrakisazo structure having aromatic rings containing heteroatoms (heterocyclic aromatic rings) as a basic backbone, and a triazine ring is introduced therein as a substituent. The triazine ring is an unsaturated 6-membered ring structure containing three nitrogen atoms, and thus has many n electrons in the substituents and stretches the conjugating system in the molecule. Therefore, the maximum absorption wavelength of an absorption spectrum of an image is shifted to a longer wavelength side, and the absorption spectrum is broad. Therefore, the absorption in the longer wavelength region increases, and thus the hue of a black image gets closer to a greenish color as compared to that of the conventional art and the black image has a preferable hue. In addition, since the compound represented by General Formula (1) has an aromatic ring having heteroatom(s) in the molecule, the polarizability in the molecule is improved, and the compound easily remains in the vicinity of a recording medium according to the improvement, and thus the color developing property is also improved. However, even in an ink using the compound represented by General Formula (1), further improvement of the color developing property and hue was necessary.

On the other hand, the triazine ring possessed by the compound represented by General Formula (1) has three nitrogen atoms having a high electronegativity inside of the 6-membered ring structure, and thus acts as an electron-withdrawing group in a case where it is used as a substituent. Therefore, the compound represented by General Formula (1) had a problem that the electrondensity on the azo bonds decreases and the bonds are easily cut, and thus the compound easily generates decomposed products due to the reactions by other compounds in an ink.

Therefore, using an ink containing the compound represented by General Formula (1) as a coloring material, the present inventors have considered so as to satisfy the storage stability of the ink and the color developing property and hue of an image. As a result, they have found that all of the storage stability of the ink and the color developing property and hue of an image can be satisfied at high levels by using an ink containing the compound represented by General Formula (1) and a specific water-soluble organic solvent at a specific ratio. As the water-soluble organic solvent to be incorporated in the ink, a water-soluble organic solvent having two or more hydroxy groups and having a Log P value of −1.88 or more to −1.09 or less (sometimes referred to as "first water-soluble organic solvent" in the present specification) is used. Furthermore, this first water-soluble organic solvent is incorporated by a content of 5.0 times or more to 30.0 times or less by a mass ratio with respect to the content (mass %) of the coloring material (the compound represented by General Formula (1)). The present inventors presume as follows the reason why the above-mentioned effect can be obtained by using such ink.

Firstly, the mechanism by which the storage stability of the ink was improved is explained. As a result of the consideration by the present inventors, it was found that the storage stability of the ink containing the compound represented by General Formula (1) was improved when a water-soluble organic solvent having two or more hydroxy groups was used. The reason can be considered that the water-soluble organic solvent forms hydrogen bonds with the compound represented by General Formula (1), whereby the vicinities of the azo bonds are sterically protected and thus the decomposition of the compound represented by General Formula (1) is suppressed. On the other hand, in cases where a water-soluble organic solvent having no hydroxy group or a water-soluble organic solvent having only one hydroxy group was used, the storage stability of the compound represented by General Formula (1) was not improved. The reason is presumed that it is necessary for obtaining a sufficient steric protective effect that the water-soluble organic solvent forms hydrogen bonds with the two nitrogen atoms in the azo bonds of the compound represented by General Formula (1).

Secondly, the mechanism of improvement of the color developing property is explained. It was found as a result of the consideration by the present inventors that the color developing property of the image was improved in a case where a water-soluble organic solvent having a Log P value of −1.88 or more to −1.09 or less was used. The Log P value is an index showing the polarity of an organic compound, and a lower value shows higher polarity. This is because the polarization of the compound represented by General Formula (1) increased by using a highly polar water-soluble organic solvent, and the aggregation among the molecules was accelerated since the reactivity with the cations in the recording medium was increased, and thus the compound had become easy to remain in the vicinity of the surface of the recording medium. On the other hand, in cases where a water-soluble organic solvent having a Log P value of greater than −1.09 or a water-soluble organic solvent having a Log P value of lower than −1.88 was used, the color developing property of the image was not improved. It is considered that, in a case where a water-soluble organic solvent having a Log P value of greater than −1.09 is used, the polarization of the compound represented by General Formula (1) is insufficient, and the compound permeates into a deep part in the thickness direction of the recording medium. Furthermore, it is considered that in a case where a water-soluble organic solvent having a Log P value of lower than −1.88 is used, the compound represented by General Formula (1) significantly undergoes the effect of the solvation by the above-mentioned water-soluble organic solvent, and permeates into a deep part in the thickness direction of the recording medium.

Accordingly, the present inventors have found that it is important to use a first water-soluble organic solvent having two or more hydroxy groups and having a Log P value of −1.88 or more to −1.09 or less so as to improve the storage stability of the ink and the color developing property of the image. The present inventors did further consideration, and consequently found that it is important to use the coloring material (compound represented by General Formula (1)) and the first water-soluble organic solvent at an appropriate mass ratio so as to attain a balance between the storage stability of the ink and the color developing property of the image. Specifically, it is necessary that the content (mass %) of the first water-soluble organic solvent is 5.0 times or more to 30.0 times or less at a mass ratio of the content (mass %) of the coloring material (the compound represented by General Formula (1)). Where the above-mentioned mass ratio is greater than 30.0 times, the solvation by the first water-soluble organic solvent is significant, and the compound represented by General Formula (1) permeates to a deep part in the thickness direction of the recording medium, and thus the color developing property is lowered. On the other hand, in a case where the above-mentioned mass ratio is lower than 5.0 times, the solvation by the first water-soluble organic solvent is insufficient, and the azo bonds in the compound represented by General Formula (1) are not sufficiently protected, and thus the storage stability is lowered.

<Ink>

The components that constitute an ink according to an embodiment of the present invention, and the physical properties of the ink are explained below in detail.

(Compound Represented by General Formula (1))

The ink contains, as a coloring material (dye), a compound represented by the following General Formula (1).

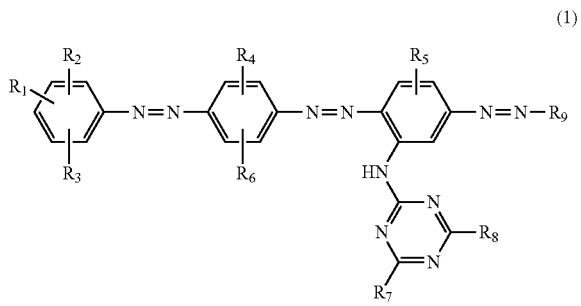

In General Formula (1), $R_1$, $R_2$ and $R_3$ each independently represent a hydrogen atom; a carboxylic acid group; a sulfonic acid group; a hydroxy group; an acetylamino group; a halogen atom; a cyano group; a nitro group; a sulfamoyl group; an alkyl group having 1 to 4 carbon atom(s); an alkoxy group having 1 to 4 carbon atom(s); an alkoxy group having 1 to 4 carbon atom(s) substituted by at least one kind of group(s) selected from the group consisting of a hydroxy group, an alkoxy group having 1 to 4 carbon atom(s), a sulfonic acid group, and a carboxylic acid group; an alkylsulfonyl group having 1 to 4 carbon atom(s); or an alkylsulfonyl group having 1 to 4 carbon atom(s) substituted by at least one kind of group(s) selected from the group consisting of a hydroxy group, a sulfonic acid group, and a carboxylic acid group.

In General Formula (1), $R_4$ and $R_5$ each independently represent an alkylthio group having 1 to 4 carbon atom(s); an alkylthio group having 1 to 4 carbon atom(s) substituted by at least one kind of group(s) selected from the group consisting of a hydroxy group, a sulfonic acid group, and a carboxylic acid group; an alkoxy group having 1 to 4 carbon atom(s); or an alkoxy group having 1 to 4 carbon atom(s) substituted by at least one kind of group(s) selected from the group consisting of a hydroxy group, a sulfonic acid group, and a carboxylic acid group.

In General Formula (1), $R_6$ represents a hydrogen atom; a carboxylic acid group; a sulfonic acid group; an alkylcarbonylamino group having 1 to 4 carbon atom(s); a halogen atom; an alkyl group having 1 to 4 carbon atom(s); an alkoxy group having 1 to 4 carbon atom(s); or an alkoxy group having 1 to 4 carbon atom(s) substituted by at least one kind of group(s) selected from the group consisting of a hydroxy group, an alkoxy group having 1 to 4 carbon atom(s), a sulfonic acid group, and a carboxylic acid group.

In General Formula (1), $R_7$ represents an anilino or naphthylamino group substituted with a sulfonic acid group, and $R_7$ may further have at least one kind of substituent(s) selected from the group consisting of: a sulfonic acid group; a carboxylic acid group; a phosphoric acid group; a sulfamoyl group; a carbamoyl group; a hydroxy group; an alkoxy group having 1 to 6 carbon atom(s); an amino group; a mono- or di-alkylamino group having 1 to 6 carbon atom(s); a mono- or di-arylamino group; an acetylamino group; an ureido group; an alkyl group having 1 to 6 carbon atom(s); a nitro group; a cyano group; a halogen atom; an alkylsulfonyl group having 1 to 6 carbon atom(s); and an alkylthio group having 1 to 6 carbon atom(s).

In General Formula (1), $R_8$ represents an anilino group; a naphthylamino group; a mono- or di-alkylamino group having 1 to 6 carbon atom(s); a mono- or di-arylamino group; an amino group; an alkylthio group having 1 to 6 carbon atom(s); a phenylthio group; a phenoxy group; an alkoxy group having 1 to 6 carbon atom(s); or a hydroxy group, and $R_8$ may further have at least one kind of substituent(s) selected from the group consisting of a sulfonic acid group; a carboxylic acid group; a phosphoric acid group; a sulfamoyl group; a carbamoyl group; a hydroxy group; an alkoxy group having 1 to 6 carbon atom(s); an amino group; a mono- or di-alkylamino group having 1 to 6 carbon atom(s); a mono- or di-arylamino group; an acetylamino group; an ureido group; an alkyl group having 1 to 6 carbon atom(s); a nitro group; a phenyl group; a furyl group; a pyridyl group; a cyano group; a halogen atom; an alkylsulfonyl group having 1 to 6 carbon atom(s); and an alkylthio group having 1 to 6 carbon atom(s).

In General Formula (1), $R_9$ represents a heterocyclic aromatic ring, or an aromatic ring to which a heterocyclic aromatic ring is bonded via an azo group, and these rings may have at least one kind of substituent(s) selected from the group consisting of: an alkyl group having 1 to 4 carbon atom(s); a sulfonic acid group; a carboxylic acid group; a phosphoric acid group; a sulfamoyl group; a carbamoyl group; a hydroxy group; an alkoxy group having 1 to 4 carbon atom(s); an alkoxy group having 1 to 4 carbon atom(s) substituted with a sulfonic acid group; a cyano group; an amino group; and an alkylcarbonylamino group having 1 to 4 carbon atom(s).

The carboxylic acid group, sulfonic acid group and phosphoric acid group in the compound represented by General Formula (1) may be of a free acid form (H-form) or a salt form. Examples of counter ions in a case where the carboxylic acid group or the like has a salt form (in a case where a salt is formed) can include cations of alkali metals, ammonium, and organic ammoniums. Examples of the alkali metals can include lithium, sodium, potassium, and the like. Examples of the organic ammoniums can include alkylamines having 1 or more to 3 or less carbon atom(s) such as methylamine and ethylamine; mono-, di- or tri-alkanolamines having 1 or more to 4 or less carbon atom(s) such as monoethanolamine, diethanolamine, triethanolamine, monoisopropanolamine, diisopropanolamine, and triisopropanolamine; and the like.

In General Formula (1), examples of the halogen atom represented by $R_1$, $R_2$ and $R_3$ include a fluorine atom, a chlorine atom, a bromine atom, an iodine atom, and the like.

In General Formula (1), examples of the alkyl group having 1 to 4 carbon atom(s) represented by $R_1$, $R_2$ and $R_3$ include straight chain or branched chain alkyl groups. Examples of the alkyl groups include a methyl group, an ethyl group, an n-propyl group, an isopropyl group, an n-butyl group, an isobutyl group, a sec-butyl group, a tert-butyl group, and the like.

In General Formula (1), examples of the alkoxy group having 1 to 4 carbon atom(s) represented by $R_1$, $R_2$ and $R_3$ include straight chain or branched chain alkoxy groups. Examples of the unsubstituted alkoxy group having 1 to 4 carbon atom(s) (unsubstituted alkoxy group) include a methoxy group, an ethoxy group, an n-propoxy group, an isopropoxy group, an n-butoxy group, a sec-butoxy group, a tert-butoxy group, and the like.

Furthermore, the alkoxy group having 1 to 4 carbon atom(s) represented by $R_1$, $R_2$ and $R_3$ may be substituted by at least one kind of group(s) selected from the group consisting of a hydroxy group, an alkoxy group having 1 to 4 carbon atom(s), a sulfonic acid group, and a carboxylic acid group. Examples of the alkoxy group having 1 to 4 carbon atom(s) substituted by at least one kind of those group(s) (substituted alkoxy group) include alkoxy groups having 1 to 4 carbon atom(s) in which the above-mentioned specific substituent(s) is/are bonded to the optional carbon atom(s). The number of those substituent(s) is generally 1 or 2, preferably 1, and the position(s) of the substituent(s) is/are not specifically limited. Examples of the alkoxy group having 1 to 4 carbon atom(s) that may be possessed by the alkoxy group having 1 to 4 carbon atom(s) represented by $R_1$ to $R_3$ as a substituent can include groups similar to those exemplified for the above-mentioned unsubstituted alkoxy groups. Examples of the substituted alkoxy group having 1 to 4 carbon atom(s) include hydroxyalkoxy groups such as a 2-hydroxyethoxy group, a 2-hydroxypropoxy group, and a 3-hydroxypropoxy group; alkoxyalkoxy groups such as a methoxyethoxy group, an ethoxyethoxy group, an n-propoxyethoxy group, an isopropoxyethoxy group, an n-butoxyethoxy group, a methoxypropoxy group, an ethoxypropoxy group, an n-propoxypropoxy group, an isopropoxybutoxy group, and an n-propoxybutoxy group; hydroxyalkoxyalkoxy groups such as a 2-hydroxyethoxyethoxy group; carboxyalkoxy groups such as a carboxymethoxy group, a 2-carboxyethoxy group, and a 3-carboxypropoxy group; and sulfoalkoxy groups such as a 3-sulfopropoxy group and a 4-sulfobutoxy group; and the like.

In this specification, in a case where a group defined by a specific carbon number has predetermined substituent(s), the carbon number in the group defined by the specific carbon number refers to a carbon number in a case where said group is unsubstituted. Therefore, for example, the above-mentioned alkoxy group having 1 to 4 carbon atom(s) substituted with an alkoxy group having 1 to 4 carbon atom(s) may have a carbon number of greater than 4 in the entirety of the group.

In General Formula (1), examples of the alkylsulfonyl group having 1 to 4 carbon atom(s) represented by $R_1$, $R_2$ and $R_3$ include straight chain or branched chain alkylsulfonyl groups, and straight chain alkylsulfonyl groups are preferable. Examples of the alkylsulfonyl group having 1 to 4 carbon atom(s) include straight chain alkylsulfonyl groups such as a methylsulfonyl group, an ethylsulfonyl group, an n-propylsulfonyl group, and an n-butylsulfonyl group; and branched chain alkylsulfonyl groups such as an isopropylsulfonyl group and an isobutylsulfonyl group. Among the above-mentioned groups, a methylsulfonyl group, an ethylsulfonyl group, and an isopropylsulfonyl group are preferable, and a methylsulfonyl group is more preferable.

Furthermore, the alkylsulfonyl group having 1 to 4 carbon atom(s) represented by $R_1$, $R_2$ and $R_3$ may be substituted by at least one kind of group(s) selected from the group consisting of a hydroxy group, a sulfonic acid group, and a carboxylic acid group. Examples of the alkylsulfonyl group having 1 to 4 carbon atom(s) substituted by at least one kind of those group(s) (substituted alkylsulfonyl group) include alkylsulfonyl groups having 1 to 4 carbon atom(s) in which the above-mentioned specific substituent(s) is/are bonded to the optional carbon atom(s). The number of the substituent(s) is generally 1 or 2, preferably 1, and the position(s) of the substituent(s) is/are not specifically limited. Examples of the substituted alkylsulfonyl group having 1 to 4 carbon atom(s) include hydroxyalkylsulfonyl groups such as a hydroxyethylsulfonyl group and a 2-hydroxypropylsulfonyl group; sulfoalkylsulfonyl groups such as a 2-sulfoethylsulfonyl group and a 3-sulfopropylsulfonyl group; carboxyalkylsulfonyl groups such as a 2-carboxyethylsulfonyl group and a 3-carboxypropylsulfonyl group; and the like.

Preferable examples of $R_1$ include a hydrogen atom, a carboxylic acid group, a sulfonic acid group, a nitro group, a chlorine atom, a methyl group, a methoxy group, a 3-sulfopropoxy group, and alkylsulfonyl groups having 1 to 4 carbon atom(s). Among these, further preferable examples of $R_1$ include a hydrogen atom; a carboxylic acid group, a sulfonic acid group, a nitro group, a chlorine atom, and alkylsulfonyl groups having 1 to 4 carbon atom(s), which are electron-withdrawing substituents; a methyl group; and a methoxy group. Specifically preferable examples of $R_1$ include a hydrogen atom and a sulfonic acid group.

Preferable examples of $R_2$ include a hydrogen atom, a carboxylic acid group, a sulfonic acid group, a nitro group, a chlorine atom, a methyl group, a methoxy group, a 3-sulfopropoxy group, a sulfamoyl group, alkylsulfonyl groups having 1 to 4 carbon atom(s), carboxyalkylsulfonyl groups (the alkyl has 1 to 4 carbon atom(s)), and sulfoalkylsulfonyl groups (the alkyl has 1 to 4 carbon atom(s)). Among these, more preferable examples of $R_2$ include a hydrogen atom; a carboxylic acid group, a sulfonic acid group, a nitro group, a chlorine atom, a sulfamoyl group, alkylsulfonyl groups having 1 to 4 carbon atom(s), carboxyalkylsulfonyl groups (the alkyl group has 1 to 4 carbon atom(s)), and sulfoalkylsulfonyl groups (the alkyl group has 1 to 4 carbon atom(s)), which are electron-withdrawing substituents; a methyl group; and a methoxy group. Further preferable examples of $R_2$ include a sulfonic acid group, a nitro group, a methyl group, a methoxy group, a sulfamoyl group, a sulfopropylsulfonyl group, and a carboxyethylsulfonyl group, and specifically preferable examples include a nitro group.

Preferable examples of $R_3$ include a hydrogen atom, a carboxylic acid group, a sulfonic acid group, a nitro group, a chlorine atom, a methyl group, a methoxy group, a 3-sulfopropoxy group, and alkylsulfonyl groups having 1 to 4 carbon atom(s). Among these, further preferable examples of $R_3$ include a hydrogen atom; a carboxylic acid group, a sulfonic acid group, a nitro group, a chlorine atom, and alkylsulfonyl groups having 1 to 4 carbon atom(s), which are electron-withdrawing substituents; a methyl group; a methoxy group; and a 3-sulfopropoxy group. Specifically preferable examples of $R_3$ include a hydrogen atom.

Furthermore, In the benzene ring to which $R_1$, $R_2$ and $R_3$ are bonded in General Formula (1), in a case where the bonding position of the azo group is the 1-position, it is preferable that the bonding position of $R_1$ is the 2-position, the bonding position of $R_2$ is the 3-position or 4-position, and the bonding position of $R_3$ is the 5-position or 6-position.

In General Formula (1), examples of the alkylthio group having 1 to 4 carbon atom(s) represented by $R_4$ and $R_5$ can include alkylthio groups wherein the alkyl is a straight chain or a branched chain, and among these, alkylthio groups wherein the alkyl is a straight chain are preferable. Examples of the alkylthio group having 1 to 4 carbon atom(s) include straight chain alkylthio groups such as a methylthio group, an ethylthio group, an n-propylthio group, and an n-butylthio group; branched chain alkylthio groups such as an isopropylthio group, an isobutylthio group, a sec-butylthio group, and a tert-butylthio group; and the like.

Furthermore, the alkylthio group having 1 to 4 carbon atom(s) represented by $R_4$ and $R_5$ may be substituted by at least one kind of group(s) selected from the group consisting of a hydroxy group, a sulfonic acid group, and a carboxylic acid group. Examples of the alkylthio group having 1 to 4 carbon atom(s) substituted by at least one kind of those group(s) (substituted alkylthio group) include alkylthio groups having 1 to 4 carbon atom(s) in which the above-mentioned specific substituent(s) is/are bonded to optional carbon atom(s). The number of the substituent(s) thereof is generally 1 or 2, preferably 1. The position(s) of the above-mentioned specific substituent(s) is/are not specifically limited, and alkylthio groups in which the above-mentioned specific substituent(s) is/are bonded to the carbon atom(s) other than the carbon atom to which the sulfur atom in the alkylthio group is bonded are preferable. Examples of the substituted alkylthio groups having 1 to 4 carbon atom(s) can include hydroxyalkylthio groups such as a 2-hydroxyethylthio group, a 2-hydroxypropylthio group, and a 3-hydroxypropylthio group; sulfoalkylthio groups such as a 2-sulfoethylthio group and a 3-sulfopropylthio group; and carboxyalkylthio groups such as a 2-carboxyethylthio group, a 3-carboxypropylthio group, and a 4-carboxybutylthio group; and the like.

In General Formula (1), examples of the alkoxy group having 1 to 4 carbon atom(s) represented by $R_4$ and $R_5$ include straight chain or branched chain alkoxy groups. Examples of the unsubstituted alkoxy group having 1 to 4 carbon atom(s) (unsubstituted alkoxy group) can include groups similar to those exemplified for the alkoxy group having 1 to 4 carbon atom(s) represented by the above-mentioned $R_1$ to $R_3$.

Furthermore, in General Formula (1), the alkoxy group having 1 to 4 carbon atom(s) represented by $R_4$ and $R_5$ may be substituted by at least one kind of group(s) selected from the group consisting of a hydroxy group, a sulfonic acid group and a carboxylic acid group. Examples of the alkoxy groups having 1 to 4 carbon atom(s) substituted by at least one kind of those group(s) (substituted alkoxy groups) include alkoxy groups having 1 to 4 carbon atom(s) in which the above-mentioned specific substituent(s) is/are bonded to optional carbon atom(s). The number of the substituent(s) is generally 1 or 2, preferably 1, and the position(s) of the substituent(s) is/are not specifically limited. Examples of the substituted alkoxy groups having 1 to 4 carbon atom(s) can include hydroxyalkoxy groups such as a 2-hydroxyethoxy group, a 2-hydroxypropoxy group, and a 3-hydroxypropoxy group; sulfoalkoxy groups such as a 2-sulfoethoxy group and a 3-sulfopropoxy group; and carboxyalkoxy groups such as a 2-carboxyethoxy group, a 3-carboxypropoxy group, and a 4-carboxybutoxy group; and the like.

It is preferable that $R_4$ and $R_5$ are each independently an alkylthio group having 1 to 4 carbon atom(s) substituted by a sulfonic acid group (a sulfoalkylthio group), and an alkylthio group having 1 to 4 carbon atom(s) substituted by a carboxylic acid group (a carboxyalkylthio group). It is further preferable that $R_4$ and $R_5$ are each independently a sulfoalkylthio group (the alkyl has 1 to 4 carbon atom(s)), and it is specifically preferable that $R_4$ and $R_5$ are both 3-sulfopropylthio groups.

In General Formula (1), the alkylcarbonylamino group having 1 to 4 carbon atom(s) represented by $R_6$ include those in which the alkyl is a straight chain or a branched chain and is unsubstituted, and those in which the alkyl is a straight chain are preferable. Examples of the alkylcarbonylamino group having 1 to 4 carbon atom(s) include straight chain alkylcarbonylamino groups such as an acetylamino(methylcarbonylamino) group, a propionylamino(ethylcarbonylamino) group, an n-propylcarbonylamino group, and an n-butylcarbonylamino group; and branched chain alkylcarbonylamino groups such as an isopropylcarbonylamino group, an isobutylcarbonylamino group, a sec-butylcarbonylamino group, and a pivaloyl amino(tert-butylcarbonylamino) group.

In General Formula (1), examples of the halogen atom and the alkyl group having 1 to 4 carbon atom(s) represented by $R_6$ can respectively include groups similar to those exemplified for the halogen atom and the alkyl group having 1 to 4 carbon atom(s) represented by the above-mentioned $R_1$ to $R_3$.

In General Formula (1), examples of the alkoxy group having 1 to 4 carbon atom(s) represented by $R_6$ include straight chain or branched chain alkoxy groups. As the unsubstituted alkoxy group having 1 to 4 carbon atom(s) (an unsubstituted alkoxy group), groups similar to those exemplified for the alkoxy group having 1 to 4 carbon atom(s) represented by the above-mentioned $R_1$ to $R_3$ can be exemplified. Furthermore, the alkoxy group having 1 to 4 carbon atom(s) represented by $R_6$ may be substituted by at least one kind of group(s) selected from the group consisting of a hydroxy group, an alkoxy group having 1 to 4 carbon atom(s), a sulfonic acid group, and a carboxylic acid group. Examples of the alkoxy group having 1 to 4 carbon atom(s) substituted by at least one kind of those group(s) (substituted alkoxy group) can include those similar to the specific examples of the substituted alkoxy group exemplified in the explanation on the above-mentioned $R_1$ to $R_3$.

As $R_6$, an alkylcarbonylamino group having 1 to 4 carbon atom(s) and an alkyl group having 1 to 4 carbon atom(s) are preferable, and a straight chain alkylcarbonylamino group having 1 to 4 carbon atom(s), and a methyl group are more preferable. Further preferable examples of $R_6$ are an acetylamino group and an n-propylcarbonylamino group, and an acetylamino group is specifically preferable.

In General Formula (1), $R_7$ represents an anilino group substituted by a sulfonic acid group, or a naphthylamino group substituted by a sulfonic acid group. These anilino group and naphthylamino group may further have at least one kind of substituent(s) selected from the group consisting of a sulfonic acid group; a carboxylic acid group; a phosphoric acid group; a sulfamoyl group; a carbamoyl group; a hydroxy group; an alkoxy group having 1 to 6 carbon atom(s); an amino group; a mono- or di-alkylamino group having 1 to 6 carbon atom(s); a mono- or di-arylamino group; an acetylamino group; an ureido group; an alkyl group having 1 to 6 carbon atom(s); a nitro group; a cyano group; a halogen atom; an alkylsulfonyl group having 1 to 6 carbon atom(s); and an alkylthio group having 1 to 6 carbon atom(s).

Examples of the alkoxy group having 1 to 6 carbon atom(s) in the substituent that may be possessed by the anilino group and naphthylamino group of $R_7$ include a straight chain, branched chain or cyclic alkoxy group having 1 to 6 carbon atom(s), preferably 1 to 4 carbon atom(s), more preferably 1 to 3 carbon atom(s). Among these, straight chain or branched chain alkoxy groups are preferable, and straight chain alkoxy groups are more preferable. Examples of the alkoxy group having 1 to 6 carbon atom(s) include straight chain alkoxy groups such as a methoxy group, an ethoxy group, an n-propoxy group, an n-butoxy group, an n-pentoxy group, and an n-hexyloxy group; branched chain alkoxy groups such as an isopropoxy group, an isobutoxy group, a t-butoxy group, an isopentoxy group, and a isohexyloxy group; cyclic alkoxy groups such as a cyclopropoxy group, a cyclopentoxy group, and a cyclohexyloxy group; and the like.

Examples of the mono-alkylamino group having 1 to 6 carbon atom(s) in the substituent that may be possessed by the anilino group and the naphthylamino group of $R_7$ include straight chain or branched chain mono-alkylamino groups having 1 to 6 carbon atom(s). Preferable examples include straight chain or branched chain mono-alkylamino groups having 1 to 4 carbon atom(s), and more preferable examples include straight chain or branched chain mono-alkylamino groups having 1 to 3 carbon atom(s). Examples of the mono-alkylamino group having 1 to 6 carbon atom(s) include straight chain alkylamino groups such as a methylamino group, an ethylamino group, an n-propylamino group, and an n-butylamino group; branched chain alkylamino groups such as an isopropylamino group, an isobutylamino group, and a t-butylamino group; and the like.

Examples of the di-alkylamino group having 1 to 6 carbon atom(s) in the substituents that may be possessed by the anilino group and the naphthylamino group of $R_7$ include di-alkylamino groups having independent two alkyls exemplified for the above-mentioned mono-alkylamino groups having 1 to 6 carbon atom(s). Examples of the di-alkylamino group having 1 to 6 carbon atom(s) include a dimethylamino group, a diethylamino group, a methylethylamino group, and the like.

Examples of the mono-arylamino group in the substituents that may be possessed by the anilino group and the naphthylamino group of $R_7$ include mono-aromatic amino groups having 6 to 10 carbon atoms, preferably a phenylamino group or a naphthylamino group, more preferably a phenylamino group.

Examples of the di-arylamino group in the substituents that may be possessed by the anilino group and the naphthylamino group of $R_7$ include di-arylamino groups having independent two aryls exemplified for the above-mentioned mono-arylamino group. Preferable examples include di-arylamino groups having identical aryl groups, and more preferable examples include di-arylamino groups having two phenyl groups, and a specific example thereof is a diphenylamino group.

Examples of the alkyl group having 1 to 6 carbon atom(s) in the substituents that may be possessed by the anilino group and the naphthylamino group of $R_7$ include straight chain, branched chain or cyclic alkyl groups having 1 to 6 carbon atom(s), preferably 1 to 4 carbon atom(s), more preferably 1 to 3 carbon atom(s). Among these, straight chain or branched chain alkyl groups are preferable, and straight chain alkyl groups are more preferable. Examples of the alkyl group having 1 to 6 carbon atom(s) include straight chain alkyl groups such as a methyl group, an ethyl group, an n-propyl group, an n-butyl group, an n-pentyl group, and an n-hexyl group; branched chain alkyl groups such as an isopropyl group, an isobutyl group, an isopentyl group and an isohexyl group; cyclic alkyl groups such as a cyclopropyl group, a cyclopentyl group, and a cyclohexyl group; and the like.

Examples of the halogen atom in the substituents that may be possessed by the anilino group and the naphthylamino group of $R_7$ include a fluorine atom, a chlorine atom, and a bromine atom. Among these, a fluorine atom or a chlorine atom is preferable, and a chlorine atom is more preferable.

Examples of the alkylsulfonyl group having 1 to 6 carbon atom(s) in the substituents that may be possessed by the anilino group and the naphthylamino group of $R_7$ include straight chain or branched chain alkylsulfonyl groups having 1 to 6 carbon atom(s), preferably 1 to 4 carbon atom(s), more preferably 1 to 3 carbon atom(s). Among these, straight chain alkylsulfonyl groups are preferable. Examples of the alkylsulfonyl groups having 1 to 6 carbon atom(s) include straight chain alkylsulfonyl groups such as a methylsulfonyl group, an ethylsulfonyl group, and a propylsulfonyl group; branched chain alkylsulfonyl groups such as an isopropylsulfonyl group; and the like.

Examples of the alkylthio group having 1 to 6 carbon atom(s) in the substituents that may be possessed by the anilino group and the naphthylamino group of $R_7$ include straight chain or branched chain alkylthio groups having 1 to 6 carbon atom(s), preferably 1 to 4 carbon atom(s), more preferably having 1 to 3 carbon atom(s). Among these, straight chain alkylthio groups are preferable. Examples of the alkylthio groups having 1 to 6 carbon atom(s) include straight chain alkylthio groups such as a methylthio group, an ethylthio group, a propylthio group, and a butylthio group; branched chain alkylthio groups such as an isopropylthio; and the like.

Preferable examples of the substituents that may be possessed by the anilino group and the naphthylamino group of $R_7$ include a sulfonic acid group, a carboxylic acid group, a phosphoric acid group, a hydroxy group, an alkoxy group having 1 to 6 carbon atom(s), an acetylamino group, an ureido group, a nitro group, and a chlorine atom. Among these, a sulfonic acid group, a carboxylic acid group, a hydroxy group, an alkoxy group having 1 to 6 carbon atom(s), a nitro group, and a chlorine atom are more preferable. Further preferable examples include a sulfonic acid group, a carboxylic acid group, a hydroxy group, a methoxy group, a nitro group, and a chlorine atom, and a sulfonic acid group is specifically preferable.

As $R_7$, an anilino group substituted by one or two sulfonic acid group(s) is preferable, an anilino group substituted by two sulfonic acid groups is more preferable, and an anilino group substituted by two sulfonic acid groups that are in a para-position from each other is further preferable.

In General Formula (1), $R_8$ represents an anilino group; a naphthylamino group; a mono- or di-alkylamino group having 1 to 6 carbon atom(s); a mono- or di-arylamino group; an amino group; an alkylthio group having 1 to 6 carbon atom(s); a phenylthio group; a phenoxy group; an alkoxy group having 1 to 6 carbon atom(s); or a hydroxy group.

The mono- or di-alkylamino group having 1 to 6 carbon atom(s) represented by $R_8$ represents the same meaning as that of the mono- or di-alkylamino group having 1 to 6 carbon atom(s) in the above-mentioned explanation of $R_7$.

The mono- or di-arylamino group represented by $R_8$ represents the same meaning as that of the mono- or di-arylamino group in the above-mentioned explanation of $R_7$.

The alkylthio group having 1 to 6 carbon atom(s) represented by $R_8$ represents the same meaning as that of the alkylthio group having 1 to 6 carbon atom(s) in the above-mentioned explanation of $R_7$.

The alkoxy group having 1 to 6 carbon atom(s) represented by $R_8$ represents the same meaning as that of the alkoxy group having 1 to 6 carbon atom(s) in the above-mentioned explanation of $R_7$.

The above-mentioned groups represented by $R_8$ may further have at least one kind of substituent(s) selected from the group consisting of: a sulfonic acid group; a carboxylic acid group; a phosphoric acid group; a sulfamoyl group; a carbamoyl group; a hydroxy group; an alkoxy group having 1 to 6 carbon atom(s); an amino group; a mono- or di-alkylamino group having 1 to 6 carbon atom(s); a mono- or di-arylamino group; an acetylamino group; an ureido group; an alkyl group having 1 to 6 carbon atom(s); a nitro group; a phenyl group; a furyl group; a pyridyl group; a cyano group; a halogen atom; an alkylsulfonyl group having 1 to 6 carbon atom(s); and an alkylthio group having 1 to 6 carbon atom(s).

As the alkoxy group having 1 to 6 carbon atom(s) that may further be possessed by the group represented by $R_8$ as a substituent, groups similar to those exemplified for the alkoxy group having 1 to 6 carbon atom(s) in the above-mentioned explanation of $R_7$, including the preferable groups, can be exemplified.

As the mono-alkylamino group having 1 to 6 carbon atom(s) that may further be possessed by the group represented by $R_8$ as a substituent, groups similar to those exemplified for the mono-alkylamino group having 1 to 6 carbon atom(s) in the above-mentioned explanation of $R_7$, including the preferable groups, can be exemplified. Furthermore, as the di-alkylamino group having 1 to 6 carbon atom(s) that may further be possessed by the group represented by $R_8$ as a substituent, groups similar to those exemplified for the di-alkylamino group having 1 to 6 carbon atom(s) in the above-mentioned explanation of $R_7$, including the preferable groups, can be exemplified.

As the mono-arylamino group that may further be possessed by the group represented by $R_8$ as a substituent, groups similar to those exemplified for the mono-arylamino group in the above-mentioned explanation of $R_7$, including the preferable groups, can be exemplified. Furthermore, as the di-arylamino group that may further be possessed by the group represented by $R_8$ as a substituent, groups similar to those exemplified for the di-arylamino group in the above-mentioned explanation of $R_7$, including the preferable groups, can be exemplified.

As the alkyl group having 1 to 6 carbon atom(s) that may further be possessed by the group represented by $R_8$ as a substituent, groups similar to those exemplified for the alkyl group having 1 to 6 carbon atom(s) in the above-mentioned explanation of $R_7$, including the preferable groups, can be exemplified.

As the halogen atom that may further be possessed by the group represented by $R_8$ as a substituent, an atom similar to that exemplified for the halogen atom in the above-mentioned explanation of $R_7$, including the preferable atom, can be exemplified.

As the alkylsulfonyl group having 1 to 6 carbon atom(s) that may further be possessed by the group represented by $R_8$ as a substituent, groups similar to those exemplified for the alkylsulfonyl group having 1 to 6 carbon atom(s) in the above-mentioned explanation of $R_7$, including the preferable groups, can be exemplified.

As the alkylthio group having 1 to 6 carbon atom(s) that may further be possessed by the group represented by $R_8$ as a substituent, groups similar to those exemplified for the alkylthio group having 1 to 6 carbon atom(s) in the above-mentioned explanation of $R_7$, including the preferable groups, can be exemplified.

As the substituent that may further be possessed by the group represented by $R_8$, a sulfonic acid group, a carboxylic acid group, a phosphoric acid group, a hydroxy group, an alkoxy group having 1 to 6 carbon atom(s), an acetylamino group, an ureido group, a nitro group, a phenyl group, and a chlorine atom are preferable. Among these, a sulfonic acid group, a carboxylic acid group, a hydroxy group, an alkoxy group having 1 to 6 carbon atom(s), a nitro group, and a chlorine atom are more preferable. More preferable examples are a sulfonic acid group, a carboxylic acid group, a hydroxy group, a methoxy group, a nitro group, and a chlorine atom, and a sulfonic acid group is specifically preferable.

As $R_8$, a mono- or di-alkylamino group having 1 to 6 carbon atom(s) having substituent(s) is preferable, a mono- or di-alkylamino group having 1 to 6 carbon atom(s) substituted by a sulfonic acid group, a carboxylic acid group, a hydroxy group, or a phenyl group is more preferable. As $R_8$, a mono-alkylamino group substituted by a sulfonic acid group (the alkyl has 1 to 6, more preferably 1 to 4, further preferably 1 to 3 carbon atom(s)) is further preferable, and a 2-sulfoethylamino group is specifically preferable.

In General Formula (1), $R_9$ represents a heterocyclic aromatic ring, or an aromatic ring to which a heterocyclic aromatic ring is bonded via an azo group, and these rings may have the following substituent(s). The substituent(s) is/are at least one kind selected from the group consisting of an alkyl group having 1 to 4 carbon atom(s); a sulfonic acid group; a carboxylic acid group; a phosphoric acid group; a sulfamoyl group; a carbamoyl group; a hydroxy group; an alkoxy group having 1 to 4 carbon atom(s); an alkoxy group having 1 to 4 carbon atom(s) substituted with a sulfonic acid group; a cyano group; an amino group; and an alkylcarbonylamino group having 1 to 4 carbon atom(s).

In a case where $R_9$ represents the heterocyclic aromatic ring having the above-mentioned specific substituent(s), the compound represented by General Formula (1) represents a trisazo compound in which said heterocyclic aromatic ring and a triazine ring are introduced. Furthermore, in a case where $R_9$ represents the aromatic ring to which a heterocyclic aromatic ring is bonded via an azo group which may have the above-mentioned specific substituent(s), the compound represented by General Formula (1) represents a tetrakisazo compound in which said heterocyclic aromatic ring and a triazine ring are introduced.

The heterocyclic aromatic ring in $R_9$ is an aromatic ring containing heteroatom(s) in the ring structure, and is a monovalent group formed by removing one hydrogen atom from a substituted or unsubstituted heterocyclic aromatic compound. Examples of the heteroatoms can include a nitrogen atom, an oxygen atom, a sulfur atom, and the like. The heterocyclic aromatic ring may contain two or more heteroatoms, and may contain one kind or two or more kinds of heteroatom(s). As the heteroatom, a nitrogen atom is preferable. Examples of the ring structure of the heterocyclic aromatic ring include monocyclic structures and polycyclic structures, and polycyclic structures in which 2 to 4 (more preferably 2 or 3) ring structures are condensed are preferable, and it is more preferable that one of those rings is a 5-membered ring or a 6-membered ring.

In the aromatic ring to which a heterocyclic aromatic ring is bonded via an azo group represented by $R_9$, examples of the ring structure of the aromatic ring, which is not the heterocyclic ring, include a monocyclic structure and a polycyclic structure, and a monocyclic structure is preferable. Examples of the aromatic group in the aromatic ring to which a heterocyclic aromatic ring is bonded via an azo group can include a phenyl group, a naphthyl group, and the like, which may be substituted, and a substituted phenyl group is preferable.

Examples of the alkyl group having 1 to 4 carbon atom(s) that may be possessed by the rings in $R_9$ as a substituent can include groups similar to those exemplified for the alkyl group having 1 to 4 carbon atom(s) represented by $R_1$ to $R_3$ in General Formula (1).

Examples of the alkoxy group having 1 to 4 carbon atom(s) that may be possessed by the rings in $R_9$ as a substituent include straight chain or branched chain alkoxy groups. Examples of the unsubstituted alkoxy group having 1 to 4 carbon atom(s) (unsubstituted alkoxy groups) can include groups similar to those exemplified for the alkoxy group having 1 to 4 carbon atom(s) represented by $R_1$ to $R_3$ in General Formula (1). Furthermore, the alkoxy group having 1 to 4 carbon atom(s) that may be possessed by the rings in $R_9$ as a substituent may be substituted by sulfonic acid group(s). Examples of the alkoxy group having 1 to 4 carbon atom(s) substituted with sulfonic acid group(s) include alkoxy groups having 1 to 4 carbon atom(s) in which sulfonic acid group(s) is/are bonded to optional carbon atom(s). The number of the substituent(s) is generally 1 or 2, preferably 1, and the position(s) of the substituent(s) is/are not specifically limited. Examples of the alkoxy group having 1 to 4 carbon atom(s) substituted with sulfonic acid group(s) can include a 2-sulfoethoxy group, a 3-sulfopropoxy group, a 4-sulfobutoxy group, and the like.

Examples of the alkylcarbonylamino group having 1 to 4 carbon atom(s) that may be possessed by the rings in $R_9$ as a substituent can include groups similar to those exemplified for the alkylcarbonylamino group having 1 to 4 carbon atom(s) represented by $R_6$ in General Formula (1), including the preferable groups.

It is preferable that $R_9$ represents a heteroaryl group optionally having the above-mentioned specific substituent(s), or an aryl group substituted by a heteroarylazo group optionally having the above-mentioned specific substituent(s) and optionally further having the above-mentioned specific substituent(s).

ther having the above-mentioned specific substituent(s) (a substituted phenyl group substituted with a substituted heteroarylazo group and further having the above-mentioned specific substituent(s)) is further preferable. As $R_9$, a substituted phenyl group which is substituted by the above-mentioned substituted heteroarylazo group at the para-position with the azo group to which $R_9$ is bonded in General Formula (1), and which has the above-mentioned specific substituent(s) is specifically preferable. Preferable examples of the substituent(s) in the heterocyclic aromatic ring (heteroaryl group) include an alkyl group having 1 to 4 carbon atom(s); a sulfonic acid group; a carbamoyl group; a hydroxy group; an alkoxy group having 1 to 4 carbon atom(s); and a cyano group. Among these, a methyl group, a sulfonic acid group, a hydroxy group, a methoxy group, and a cyano group are further preferable. Preferable examples of the substituent(s) in the substituted aryl group (substituted phenyl group) include an alkyl group having 1 to 4 carbon atom(s); an alkoxy group having 1 to 4 carbon atom(s) substituted with a sulfonic acid group; and an alkylcarbonylamino group having 1 to 4 carbon atom(s). Among these, a methyl group and a sulfopropoxy group are further preferable.

It is preferable that the compound represented by the above-mentioned General Formula (1) is a compound represented by the following General Formula (2). Furthermore, it is preferable that the compound represented by the following General Formula (2) is a compound represented by the following General Formula (3).

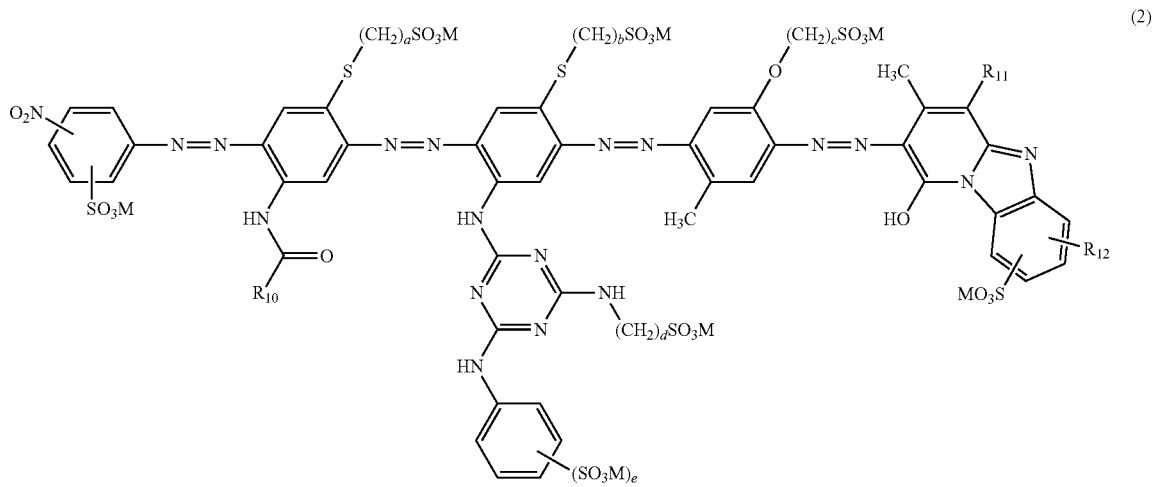

As $R_9$, an aromatic ring in which a heterocyclic aromatic ring having the above-mentioned specific substituent(s) is bonded via an azo group, and which further has the above-mentioned specific substituent(s) (a substituted aryl group substituted with a substituted heteroarylazo group and further having the above-mentioned specific substituent(s)) is more preferable. As $R_9$, a phenyl group substituted with an azo group to which a heterocyclic aromatic ring having the above-mentioned specific substituent(s) is bonded, and fur- In General Formula (2), $R_{10}$ represents an alkyl group having 1 to 4 carbon atom(s), $R_{11}$ represents a carbamoyl group, a cyano group, an amino group, or an alkylcarbonylamino group having 1 to 4 carbon atom(s), $R_{12}$ represents a hydrogen atom or an alkoxy group having 1 to 4 carbon atom(s), Ms each independently represent a hydrogen atom, an alkali metal, an ammonium, or an organic ammonium, a, b, c and d each independently represent an integer of 1 or more to 4 or less, and e represents 1 or 2.

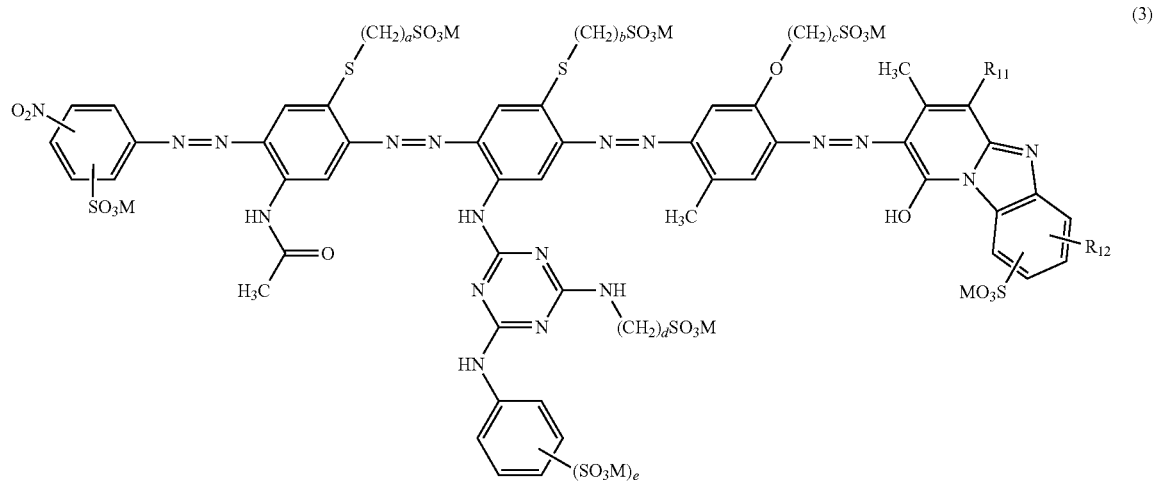

(3)

In General Formula (3), $R_{11}$ represents a carbamoyl group, a cyano group, an amino group, or an alkylcarbonylamino group having 1 to 4 carbon atom(s), $R_{12}$ represents a hydrogen atom or an alkoxy group having 1 to 4 carbon atom(s), Ms each independently represent a hydrogen atom, an alkali metal, an ammonium, or an organic ammonium, a, b, c and d each independently represent an integer of 1 or more to 4 or less, and e represents 1 or 2.

In General Formula (2), the alkyl group having 1 to 4 carbon atom(s) represented by $R_{10}$ has a meaning identical to that of the alkyl group having 1 to 4 carbon atom(s) that may be possessed as a substituent by the specific aromatic ring represented by $R_9$ in the above-mentioned General Formula (1).

In General Formulas (2) and (3), the alkylcarbonylamino group having 1 to 4 carbon atom(s) represented by $R_{11}$ has a meaning identical to that of the alkylcarbonylamino group having 1 to 4 carbon atom(s) that may be possessed as a substituent by the specific aromatic ring represented by $R_9$ in the above-mentioned General Formula (1).

In General Formulas (2) and (3), the alkoxy group having 1 to 4 carbon atom(s) represented by $R_{12}$ has a meaning identical to that of the alkoxy group having 1 to 4 carbon atom(s) that may be possessed as a substituent by the specific aromatic ring represented by $R_9$ in the above-mentioned General Formula (1).

In General Formulas (2) and (3), examples of the alkali metal and the organic ammonium represented by M can respectively include those similar to those exemplified for the counter ions in a case where the above-mentioned carboxylic acid group and the like are in salt forms.

When preferable examples of the compound represented by General Formula (1) are represented by free acid forms, Exemplary Compounds 1 to 42 shown in Tables 1 to 3 can be exemplified. The exemplary compounds are represented by the format of the following General Formula (4) in Table 1, by the format of the following General Formula (5) in Table 2, and by the format of the following General Formula (6) in Table 3, respectively. "Ph" in the tables represents a phenyl group. As a matter of course, the compound represented by General Formula (1) is not limited to the exemplary compounds mentioned below as long as it is encompassed in the structure and definition of General Formula (1). Among the exemplary compounds mentioned below, Exemplary Compounds 8 to 24 are preferable, Exemplary Compounds 14 to 24 are further preferable, and Exemplary Compounds 21 to 24 are specifically preferable.

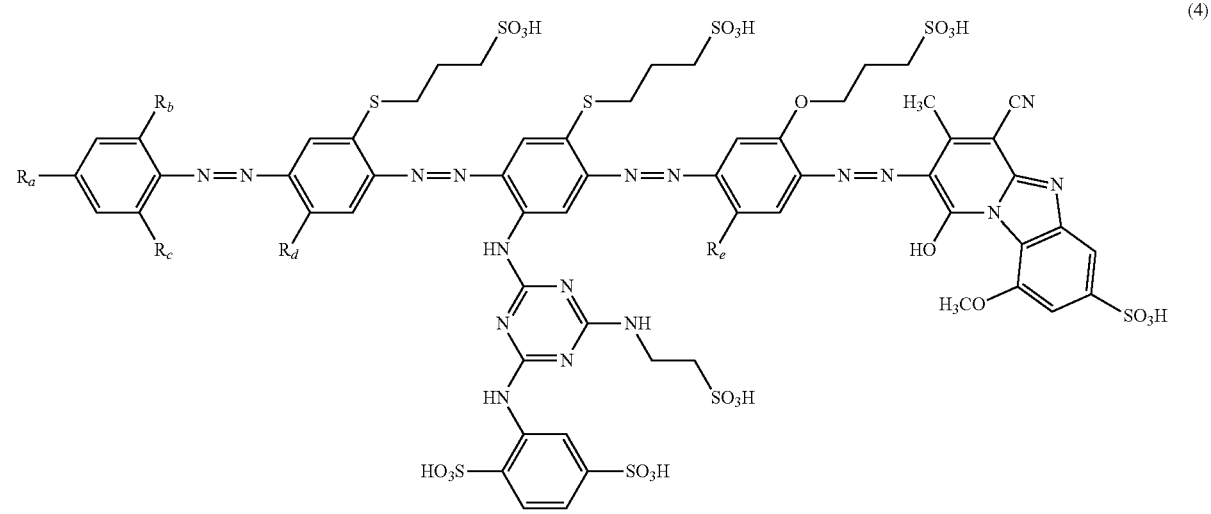

(4)

TABLE 1

Structures of Exemplary Compounds 1 to 29

| Exemplary Compound | $R_a$ | $R_b$ | $R_c$ | $R_d$ | $R_e$ |
|---|---|---|---|---|---|
| 1 | $NO_2$ | H | H | $NHCOCH_3$ | $CH_3$ |
| 2 | COOH | H | H | $NHCOCH_3$ | $CH_3$ |
| 3 | $SO_3H$ | H | H | $NHCOCH_3$ | $CH_3$ |
| 4 | Cl | H | H | $NHCOCH_3$ | $CH_3$ |
| 5 | $CH_3$ | H | H | $NHCOCH_3$ | $CH_3$ |
| 6 | $OCH_3$ | H | H | $NHCOCH_3$ | $CH_3$ |
| 7 | $OC_3H_6SO_3H$ | H | H | $NHCOCH_3$ | $CH_3$ |
| 8 | COOH | $SO_3H$ | H | $NHCOCH_3$ | $CH_3$ |
| 9 | $SO_3H$ | $SO_3H$ | H | $NHCOCH_3$ | $CH_3$ |
| 10 | Cl | $SO_3H$ | H | $NHCOCH_3$ | $CH_3$ |
| 11 | $CH_3$ | $SO_3H$ | H | $NHCOCH_3$ | $CH_3$ |
| 12 | $OCH_3$ | $SO_3H$ | H | $NHCOCH_3$ | $CH_3$ |
| 13 | $OC_3H_6SO_3H$ | $SO_3H$ | H | $NHCOCH_3$ | $CH_3$ |
| 14 | $NO_2$ | $SO_3H$ | COOH | $NHCOCH_3$ | $CH_3$ |
| 15 | $NO_2$ | $SO_3H$ | $SO_3H$ | $NHCOCH_3$ | $CH_3$ |
| 16 | $NO_2$ | $SO_3H$ | $NO_2$ | $NHCOCH_3$ | $CH_3$ |
| 17 | $NO_2$ | $SO_3H$ | Cl | $NHCOCH_3$ | $CH_3$ |
| 18 | $NO_2$ | $SO_3H$ | $CH_3$ | $NHCOCH_3$ | $CH_3$ |
| 19 | $NO_2$ | $SO_3H$ | $OCH_3$ | $NHCOCH_3$ | $CH_3$ |
| 20 | $NO_2$ | $SO_3H$ | $OC_3H_6SO_3H$ | $NHCOCH_3$ | $CH_3$ |
| 21 | $NO_2$ | $SO_3H$ | H | $NHCOC_3H_7$ | $CH_3$ |
| 22 | $NO_2$ | $SO_3H$ | H | $CH_3$ | $CH_3$ |
| 23 | $NO_2$ | $SO_3H$ | H | $CH_3$ | $NHCOCH_3$ |
| 24 | $NO_2$ | $SO_3H$ | H | $NHCOCH_3$ | $CH_3$ |
| 25 | $NO_2$ | COOH | H | $NHCOCH_3$ | $CH_3$ |
| 26 | $NO_2$ | $NO_2$ | H | $NHCOCH_3$ | $CH_3$ |
| 27 | $NO_2$ | Cl | H | $NHCOCH_3$ | $CH_3$ |
| 28 | $NO_2$ | $CH_3$ | H | $NHCOCH_3$ | $CH_3$ |
| 29 | $NO_2$ | $OCH_3$ | H | $NHCOCH_3$ | $CH_3$ |

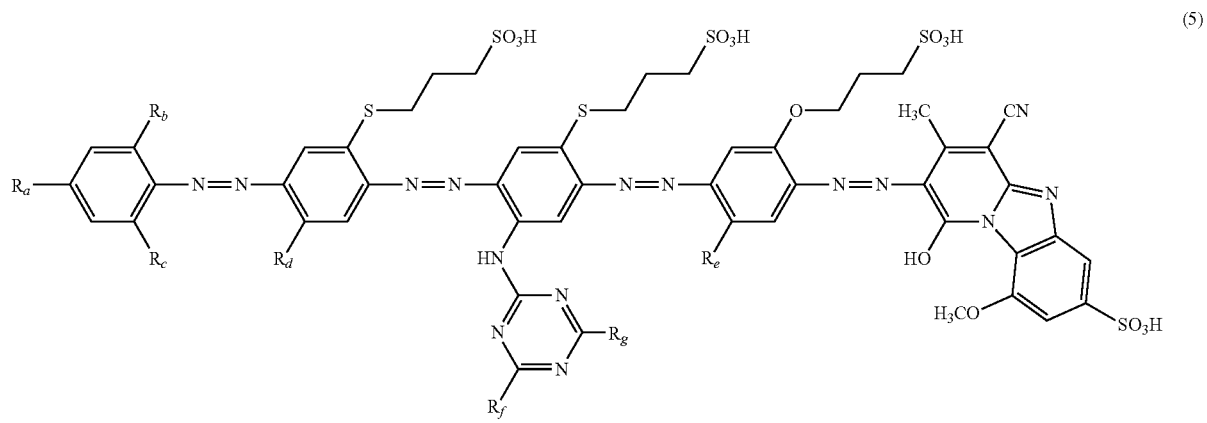

(5)

TABLE 2

Structures of Exemplary Compounds 30 to 37

| Exemplary Compound | $R_a$ | $R_b$ | $R_c$ | $R_d$ | $R_e$ | $R_f$ | $R_g$ |
|---|---|---|---|---|---|---|---|
| 30 | $NO_2$ | $SO_2H$ | H | $NHCOCH_3$ | $CH_3$ |  | $NHC_2H_4COOH$ |

TABLE 2-continued

Structures of Exemplary Compounds 30 to 37

| Exemplary Compound | $R_a$ | $R_b$ | $R_c$ | $R_d$ | $R_e$ | $R_f$ | $R_g$ |
|---|---|---|---|---|---|---|---|
| 31 | $NO_2$ | SOH | H | $NHCOCH_3$ | $CH_3$ | 2-HN-, 4-$SO_3H$, 1-$SO_3H$ phenyl | $N(CH_3)C_2H_4COOH$ |
| 32 | $NO_2$ | $SO_3H$ | H | $NHCOCH_3$ | $CH_3$ | 2-HN-, 4-$SO_3H$, 1-$SO_3H$ phenyl | $NHC_2H_4OH$ |
| 33 | $NO_2$ | $SO_3H$ | H | $NHCOCH_3$ | $CH_3$ | 2-HN-, 4-$SO_3H$, 1-$SO_3H$ phenyl | $N(CH_2COOH)_2$ |
| 34 | $NO_2$ | $SO_3H$ | H | $NHCOCH_3$ | $CH_3$ | 2-HN-, 4-$SO_3H$, 1-$SO_3H$ phenyl | $NHCH_2Ph$ |
| 35 | $NO_2$ | $SO_3H$ | H | $NHCOCH_3$ | $CH_3$ | 2-HN-, 1-$SO_3H$ phenyl | $NHC_2H_4SO_3H$ |
| 36 | $NO_2$ | $SO_3H$ | H | $NHCOCH_3$ | $CH_3$ | 3-HN-, 1-$SO_3H$ phenyl | $NHC_2H_4SO_3H$ |
| 37 | $NO_2$ | $SO_3H$ | H | $NHCOCH_3$ | $CH_3$ | 8-HN-, 1-$SO_3H$, 3-$SO_3H$, 6-$SO_3H$ naphthyl | $NHC_2H_4SO_3H$ |

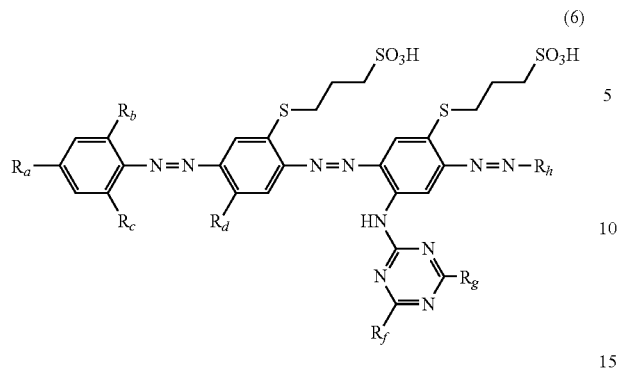

TABLE 3

Structures of Exemplary Compounds 38 to 42

| Exemplary | $R_a$ | $R_b$ | $R_c$ | $R_d$ | $R_f$ | $R_g$ | $R_h$ |
|---|---|---|---|---|---|---|---|
| 38 | $NO_2$ | $SO_3H$ | H | $NHCOCH_3$ | (2-amino-5-sulfophenylamino) | $NHC_2H_4SO_3H$ | (methyl-cyano-hydroxy-methoxy-sulfo benzimidazopyridine) |
| 39 | $NO_2$ | $SO_3H$ | H | $NHCOCH_3$ | (2-amino-5-sulfophenylamino) | $NHC_2H_4SO_3H$ | (dimethyl-amino-hydroxy-methoxy-sulfo benzimidazopyridine) |
| 40 | $NO_2$ | $SO_3H$ | H | $NHCOCH_3$ | (2-amino-5-sulfophenylamino) | $NHC_2H_4SO_3H$ | (methyl-NHCOCH$_3$-hydroxy-methoxy-sulfo benzimidazopyridine) |
| 41 | $NO_2$ | $SO_3H$ | H | $NHCOCH_3$ | (2-amino-5-sulfophenylamino) | $NHC_2H_4SO_3H$ | (sulfopropoxy-dimethylphenyl-azo-methyl-amino-hydroxy-methoxy-sulfo benzimidazopyridine) |

TABLE 3-continued

Structures of Exemplary Compounds 38 to 42

| Exemplary | $R_a$ | $R_b$ | $R_c$ | $R_d$ | $R_f$ | $R_g$ | $R_h$ |
|---|---|---|---|---|---|---|---|
| 42 | $NO_2$ | $SO_3H$ | H | $NHCOCH_3$ | (structure) | $NHC_2H_4SO_3H$ | 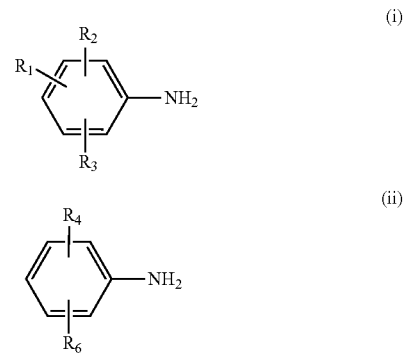 |

The content (mass %) of the coloring material in the ink is preferably 0.5 mass % or more to 5.0 mass % or less, more preferably 1.6 mass % or more to 4.0 mass % or less on the basis of the total mass of the ink.

The compound represented by General Formula (1) can be synthesized, for example, according the method shown below. An example of the synthesis of a compound represented by the following General Formula (7) as a free acid form is shown, as a preferable example of the compound represented by General Formula (1). The structural formulas of the compounds in the respective steps are represented as free acid forms. $R_1$ to $R_8$ in the following Formulas (i) to (viii) have the same meanings as those of $R_1$ to $R_8$ in General Formula (1).

(i)

(ii)

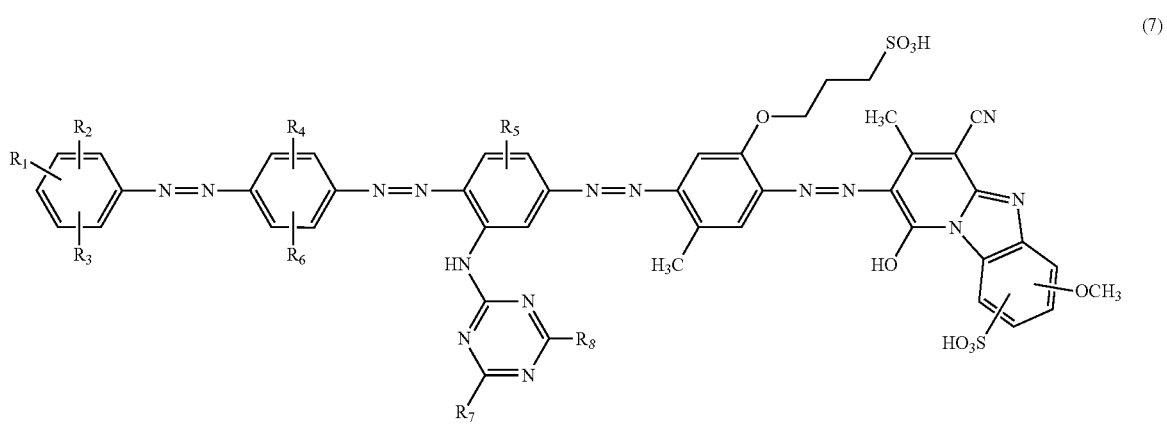

(7)

A compound represented by the following General Formula (i) is diazotized according to a conventional method to give a diazo compound, and the obtained diazo compound and a compound represented by the following General Formula (ii) are subjected to a coupling reaction according to a conventional method, whereby a compound represented by the following General Formula (iii) is obtained.

-continued

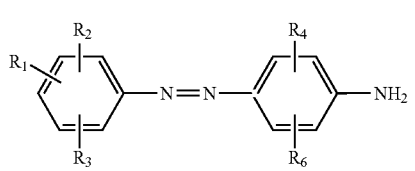

(iii)

The compound represented by General Formula (iii) is diazotized according to a conventional method to give a diazo compound, and the obtained diazo compound and a compound represented by the following General Formula (iv) are subjected to a coupling reaction according to a conventional method, whereby a compound represented by the following General Formula (v) is obtained.

The compound represented by General Formula (v) is diazotized according to a conventional method to give a diazo compound, and the obtained diazo compound and a compound represented by the following General Formula (vi) are subjected to a coupling reaction according to a conventional method, whereby a compound represented by the following General Formula (vii) is obtained.

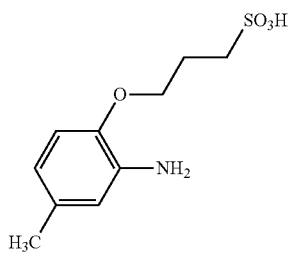

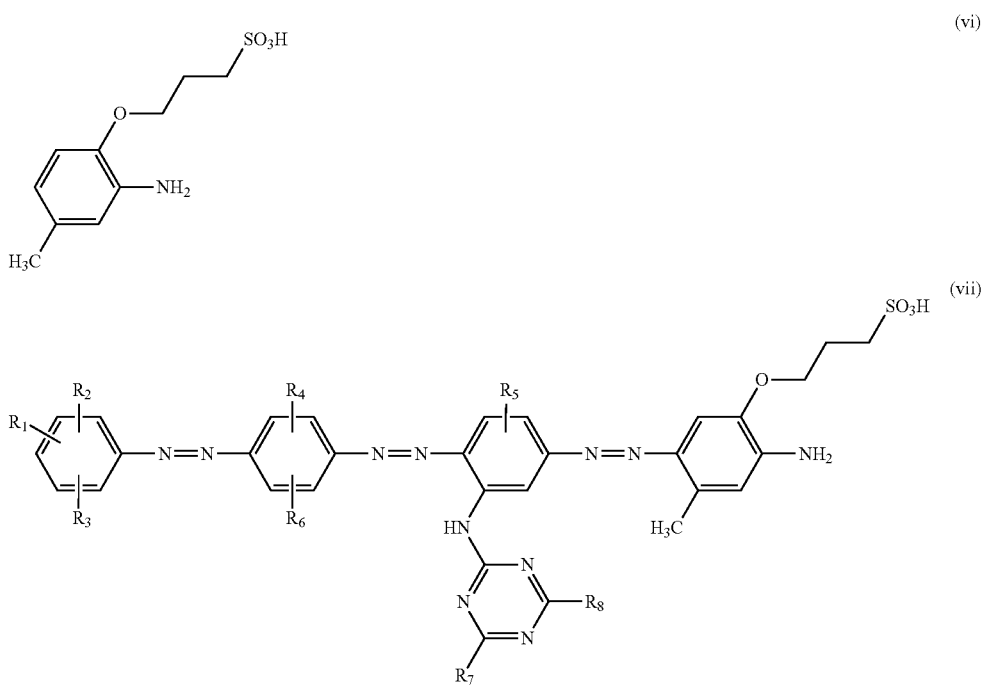

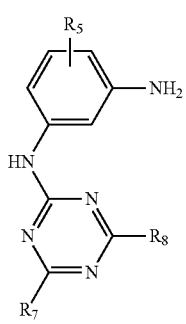

The compound represented by the above-mentioned General Formula (vii) is diazotized according to a conventional method to give a diazo compound, and the obtained diazo compound and a compound represented by the following General Formula (viii) are subjected to a coupling reaction according to a conventional method, whereby a compound represented by the above-mentioned General Formula (7) can be obtained.

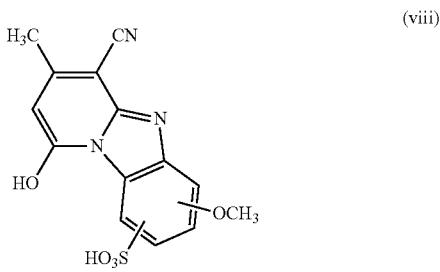

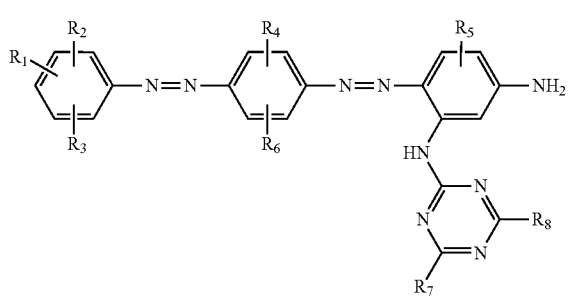

The diazotization of the compound represented by General Formula (i) is conducted by a known method. For example, the compound is diazotized in an inorganic acid medium at −5 to 30° C., preferably at 0 to 15° C. by using a nitrite. As the nitrite, a nitrite of an alkali metal such as sodium nitrite can be used. The coupling reaction of the diazotized product of the compound represented by General Formula (i) and the compound represented by General Formula (ii) is also conducted by a known method. For example, the coupling reaction is conducted in water or an aqueous organic medium, at −5 to 30° C., preferably at 0 to 25° C., at a pH value of acidic to neutral, preferably at a pH of 1 to 6. The reaction liquid for the diazotization is acidic. Furthermore, since the coupling reaction progresses, the reaction liquid for the diazotization is further acidified. Therefore, the pH of the reaction liquid is adjusted to a preferable value by adding a base. As the base, alkali metal hydroxides such as lithium hydroxide, sodium hydroxide, and potassium hydroxide; alkali metal carbonate salts such as lithium carbonate, sodium carbonate, and potassium carbonate; alkali metal acetates such as sodium acetate; ammonia; organic amines, and the like can be used. Furthermore, the compound represented by General Formula (i) and the compound represented by General Formula (ii) may be used at approximately stoichiometric amounts.

The compound represented by General Formula (iii) is diazotized by a known method. For example, the compound is diazotized in an inorganic acid medium at −5 to 40° C., preferably at 5 to 30° C. by using a nitrite. As the nitrite, alkali metal nitrites such as sodium nitrite can be used. The coupling reaction of the diazotized product of the compound represented by General Formula (iii) and the compound represented by General Formula (iv) is also conducted by a known method. The coupling reaction is conducted in water or an aqueous organic medium, at −5 to 40° C., preferably at 10 to 30° C., at a pH value of acidic to neutral, preferably at a pH of 2 to 7. The reaction liquid for the diazotization is acidic. Furthermore, since the coupling reaction progresses, the reaction liquid for the diazotization is further acidified. Therefore, the pH of the reaction liquid is adjusted to a preferable value by adding a base. As the base, bases similar to those mentioned above can be used. Furthermore, the compound represented by General Formula (iii) and the compound represented by General Formula (iv) may be used at approximately stoichiometric amounts.

The compound represented by General Formula (v) is diazotized by a known method. For example, the compound is diazotized in an inorganic acid medium at −5 to 50° C., preferably at 5 to 40° C. by using a nitrite. As the nitrite, alkali metal nitrites such as sodium nitrite can be used. The coupling reaction of the diazotized product of the compound represented by General Formula (v) and the compound represented by General Formula (vi) is also conducted by a known method. The coupling reaction is conducted in water or an aqueous organic medium, at −5 to 50° C., preferably at 10 to 40° C., at a pH value of acidic to neutral, preferably at a pH of 2 to 7. The reaction liquid for the diazotization is acidic. Furthermore, since the coupling reaction progresses, the reaction liquid for the diazotization is further acidified. Therefore, the pH of the reaction liquid is adjusted to a preferable value by adding a base. As the base, bases similar to those mentioned above can be used. The compound represented by General Formula (v) and the compound represented by General Formula (vi) may be used at approximately stoichiometric amounts.

The compound represented by General Formula (vii) is diazotized by a known method. For example, the compound is diazotized in an inorganic acid medium at −5 to 50° C., preferably at 10 to 40° C. by using a nitrite. As the nitrite, alkali metal nitrites such as sodium nitrite can be used. The coupling reaction of the diazotized product of the compound represented by General Formula (vii) and the compound represented by General Formula (viii) is also conducted by a known method. The coupling reaction is conducted in water or an aqueous organic medium, at −5 to 50° C., preferably at 10 to 40° C., at a pH value of weak acidic to alkalinity, preferably at a pH of 5 to 10. The reaction liquid for the diazotization is acidic. Furthermore, since the coupling reaction progresses, the reaction liquid for the diazotization is further acidified. Therefore, the pH of the reaction liquid is adjusted to a preferable value by adding a base. As the base, bases similar to those mentioned above can be used. The compound represented by General Formula (vii) and the compound represented by General Formula (viii) may be used at approximately stoichiometric amounts.

By conducting the following treatment after the above-mentioned synthesis flow, the compound represented by General Formula (1) in a salt form can be obtained. A method for salting-out by adding a desired salt to the reaction system is exemplified. Furthermore, a method in which a mineral acid such as hydrochloric acid is added to a reaction system, a compound in a free acid form is separated, the obtained compound is washed, and a desired salt is added again to the free acid in an aqueous liquid medium (preferably water) to give a salt form compound, is exemplified.

(Method for Verifying Coloring Material)

In order to verify whether or not the coloring material used in the present invention (the compound represented by General Formula (1)) is contained in each ink, the verification methods of the following (1) and (2) using high-speed liquid chromatography (HPLC) can be applied.
(1) Retention time of peak
(2) M/Z (posi) and M/Z (nega) of mass spectrum for peak of (1)

The analysis conditions for the high-speed liquid chromatography are as shown below. A liquid (ink) diluted to about 1,000 times with pure water is used as a measurement sample. Furthermore, the measurement sample is analyzed by high-speed liquid chromatography under the following conditions, and the retention time of the peak is measured.

Column: SunFire $C_{18}$ (manufactured by Nihon Waters K.K.) 2.1 mm×150 mm
Column temperature: 40° C.
Flow rate: 0.2 mL/min
PDA: 200 nm to 700 nm
Mobile phase and gradient condition: Table 4

TABLE 4

| Mobile Phases and Gradient Conditions | | | | |
|---|---|---|---|---|
| | 0-5 min | 5-24 min | 24-31 min | 31-45 min |
| A: Water | 90% | 90→45% | 45→0% | 0% |
| B: Methanol | 5% | 5→50% | 50→95% | 95% |
| C: 0.2 mol/L Aqueous ammonium acetate solution | 5% | 5% | 5% | 5% |

Furthermore, the conditions of the analysis of a mass spectrum are as shown below. A mass spectrum was measured under the following conditions for the obtained peak, and the most strongly detected M/Z is measured for posi and nega, respectively.

Ionization method: ESI
Capillary voltage: 3.5 kV
Desolventization gas: 300° C.
Ion source temperature: 120° C.
Detector:
Posi; 40 V 200 to 1,500 amu/0.9 sec
Nega; 40 V 200 to 1,500 amu/0.9 sec Under the above-mentioned method and conditions, Exemplary Compound 24, which is a specific example of the compound represented by General Formula (1), was measured. As a result, the values of the obtained retention time, M/Z (posi) and M/Z (nega) are shown in Table 5. In a case where an unknown ink is measured under the method and conditions similar to those mentioned above, and the obtained measured values fall within the values shown in Table 5, it can be judged that the compound represented by General Formula (1) used in the ink of an embodiment of the present invention is contained.

TABLE 5

Results of Measurements

| | Retention Time (min) | M/Z posi | M/Z nega |
|---|---|---|---|
| Exemplary Compound 24 | 26.0-30.0 | 1861 | 1859 |

(First Water-Soluble Organic Solvent)

The ink according to an embodiment of the present invention contains a first water-soluble organic solvent having a Log P value of −1.88 or more to −1.09 or less and having two or more hydroxy groups. The content (mass %) of the first water-soluble organic solvent in the ink is preferably 5.0 mass % or more to 70.0 mass % or less based on the total mass of the ink. The content of the first water-soluble organic solvent in the ink is more preferably 5.0 mass % or more to 60.0 mass % or less, further preferably 10.0 mass % or more to 35.0 mass % or less based on the total mass of the ink. Furthermore, it is necessary that the content (mass %) of the first water-soluble organic solvent is 5.0 times or more to 30.0 times or less by a mass ratio with respect to the content (mass %) of the coloring material (the compound represented by General Formula (1)). When the above-mentioned mass ratio is greater than 30.0 times, the color developing property is lowered, whereas when the mass ratio is lower than 5.0 times, the storage stability is lowered.

Log P (Log Pow), which is an index showing the polarity of the water-soluble organic solvent, is explained. Log P refers to a distribution coefficient of water and octanol (1-octanol). Log P is a physical property value relating to the adaptability of a targeted substance to water, and the substance has lower polarity at a larger value of Log P. Log P is calculated by a relational formula Log P=$Log_{10}C_o/C_w$ ($C_o$ represents a concentration of a targeted substance in an octanol phase, and $C_w$ represents a concentration of a targeted substance in an aqueous phase). Log P can also be experimentally obtained by the method described in JIS Z 7260-107. Alternatively, Log P can also be obtained by using commercially available calculation software such as trade name "ACD/PhysChem Suite" (manufactured by ACD/Labs). In the Examples mentioned below, values obtained by trade name "ACD/PhysChem Suite Version 12.00" (manufactured by ACD/Labs) were adopted. The Log P values of various water-soluble organic solvents are shown below.

Specific examples of the first water-soluble organic solvent can include a polyethylene glycol having a number average molecular weight of 200 (−1.88, 2), tetraethylene glycol (−1.88, 2), bis(2-hydroxyethyl)sulfone (−1.86, 2), glycerin (−1.85, 3), triethylene glycol (−1.65, 2), diethylene glycol (−1.41, 2), 1,2,6-hexanetriol (−1.39, 3), ethylene glycol (−1.36, 2), 1,3-propanediol (−1.09, 2), and the like. The brackets in the above-mentioned specific examples sequentially represent the Log P value and the hydroxy group number of each solvent.

It is preferable that the ink according to an embodiment of the present invention contains, as the first water-soluble organic solvent, at least one kind selected from the group consisting of a polyethylene glycol having a number average molecular weight of 200, tetraethylene glycol, triethylene glycol, and diethylene glycol. The present inventors found that, by incorporating these first water-soluble organic solvents in the ink, the ink has excellent storage stability, and an image having high color developing property and having an excellent hue such that a greenish black color is exhibited can be obtained. The reason is presumed that the non-covalent electron pairs of the oxygen atoms contained in the ethylene glycols and the compound represented by General Formula (1) formed a conjugating system, and thus the wavelength becomes long and the hue turned greenish. At this time, in a case where the hydroxy group number in the molecule is lower than 2, the number of the oxygen atoms in the molecule is insufficient, and thus a conjugating system cannot be formed, and the absorption spectrum of the compound represented by General Formula (1) is not shifted to the long wavelength side.

It is preferable that the ink according to an embodiment of the present invention contains bis(2-hydroxyethyl)sulfone as the first water-soluble organic solvent. Bis(2-hydroxyethyl)sulfone is a compound having a sulfonyl group having specifically high electron-withdrawing property, and further enhances the polarization of the compound represented by General Formula (1). Therefore, the compound represented by General Formula (1) aggregates in the vicinity of a surface of a recording medium, and thus the color developing property is improved.

(Aqueous Medium)

An aqueous medium, which is a mixed solvent of water and a water-soluble organic solvent, can be used in the ink according to an embodiment of the present invention. As the water, deionized water (ion-exchanged water) is preferably used. The content (mass %) of the water in the ink is preferably 10.0 mass % or more to 90.0 mass % or less on the basis of the total mass of the ink.

Although "water-soluble organic solvent" generally refers to a liquid, a water-soluble organic solvent that is a solid at a temperature of 25° C. is also deemed to be encompassed in the water-soluble organic solvent in the present invention. As the water-soluble organic solvent, in addition to the first water-soluble organic solvent, ethylene glycols that can be used as necessary, and bis(2-hydroxyethyl)sulfone, water-soluble organic solvents other than these water-soluble organic solvents (other water-soluble organic solvents) can be used in combination. Examples of the other water-soluble organic solvents include water-soluble organic solvents that can be used in ink jet inks such as alcohols, polyvalent alcohols, polyglycols, glycol ethers, nitrogen-containing polar solvents, and sulfur-containing polar solvents. Furthermore, one kind or two or more kinds of those other water-soluble organic solvents can be used. The content (mass %) of the water-soluble organic solvent in the ink is preferably 5.0 mass % or more to 90.0 mass % or less based on the total mass of the ink. The content of the water-soluble organic solvent in the ink is more preferably 5.0 mass % or more to 50.0 mass % or less, further preferably 10.0 mass % or more to 50.0 mass % or less based on the total mass of the ink. The content of the water-soluble organic solvent is a value including the content of the first water-soluble organic solvent. If the content of the water-soluble organic solvent is out of the above-mentioned range, the ejection stability of the ink at a high level is not sufficiently obtained in some cases.

Specific examples of the water-soluble organic solvent include, those indicated below, and the like, including the specific water-soluble organic solvents exemplified above. The brackets in the above-mentioned specific examples sequentially represent the Log P value and the hydroxy group number of each solvent. A polyethylene glycol having a number average molecular weight of 400 (−2.82, 2), a polyethylene glycol having a number average molecular weight of 200 (−1.88, 2), tetraethylene glycol (−1.88, 2), bis(2-hydroxyethyl)sulfone (−1.86, 2), glycerin (−1.85, 3), urea (−1.66, 0), triethylene glycol (−1.65, 2), diethylene glycol (−1.41, 2), 1,2,6-hexanetriol (−1.39, 3), ethylene glycol (−1.36, 2), 1,3-propanediol (−1.09, 2), 2-pyrrolidone (−1.09, 0), 1,2-propanediol (−1.01, 2), trimethylolpropane (−0.97, 3), 1,4-butanediol (−0.77, 2), N-methyl-2-pyrrolidone (−0.64, 0), 1,5-pentanediol (−0.56, 2), 3-methyl-1,5-pentanediol (−0.21, 2), 1,6-hexanediol (−0.05, 2), isopropanol (0.18, 1), triethylene glycol monobutyl ether (0.36, 1), 1,2-hexanediol (0.52, 2), diethylene glycol monobutyl ether (0.60, 1).

(Other Additives)

The ink according to an embodiment of the present invention may further contain as necessary, besides the above-mentioned components, various additives such as resins, surfactants, pH adjusting agents, anticorrosive agents, antiseptic agents, antimold agents, antioxidants, antireducing agents, evaporation promoters, chelating agents, and resins.

(Physical Properties of Ink)

The surface tension of the ink according to an embodiment of the present invention at 25° C. is preferably 10 mN/m or more to 60 mN/m or less, further preferably 20 mN/m or more to 60 mN/m or less, specifically preferably 30 mN/m or more to 40 mN/m or less. By setting the surface tension of the ink to be within the above-mentioned range, occurrence of ejection twisting (displacement of a portion where the ink is to be applied on a recording medium) and the like due to wetting in the vicinity of an ejection port where the ink is applied to an ink jet system can be effectively suppressed. The surface tension of the ink can be adjusted by suitably presetting the contents of the surfactant, the water-soluble organic solvent, and the like in the ink. Furthermore, it is preferable to adjust the viscosity of the ink so that a fine ejection property can be obtained when the ink is ejected from an ejection port of an ink jet recording head. The viscosity of the ink according to an embodiment of the present invention at 25° C. is preferably 1.0 mPa·s or more to 5.0 mPa·s or less, further preferably 1.0 mPa·s or more to 3.0 mPa·s or less.

(Other Inks)

In order to form a full-color image and the like, the ink according to an embodiment of the present invention, and other inks having other hues than that of the ink according to an embodiment of the present invention can be used in combination. Examples of the other inks can include at least one kind selected from the group consisting of a black ink, a cyan ink, a magenta ink, a yellow ink, a red ink, a green ink, and a blue ink. Furthermore, so-called pale inks having substantially the same hues as that of these inks can further be used in combination. The coloring materials used for the other inks and pale inks may be either known dyes or newly synthesized dyes.

<Ink Cartridge>

The ink cartridge according to an embodiment of the present invention includes an ink and an ink storage portion configured to house this ink. Furthermore, the ink housed in this ink storage portion is the ink according to an embodiment of the present invention explained above. FIG. 1 is a cross-sectional view schematically showing the ink cartridge according to an embodiment of the present invention. As shown in FIG. 1, an ink feeding port 12 for feeding an ink to a recording head is disposed on the bottom surface of the ink cartridge. The inside of the ink cartridge is an ink storage portion for storage of an ink. The ink storage portion is constituted by an ink storage chamber 14 and an absorber storage chamber 16, and these are in communication via a communication port 18. Furthermore, the absorber storage chamber 16 is in communication with the ink feeding port 12. A liquid ink 20 is housed in the ink storage chamber 14, and absorbers 22 and 24 that are configured to retain the ink in an impregnated state are housed in the absorber storage chamber 16. The ink storage portion may have a form that does not have an ink storage chamber for storage of a liquid ink and is configured to retain the whole amount of an ink to be housed by an absorber. Alternatively, the ink storage portion may also have a form that does not have an absorber and is configured to house the whole amount of an ink in a liquid state. Alternatively, the ink cartridge may have a form constituted so as to have an ink storage portion and a recording head.

<Ink Jet Recording Method>

The ink jet recording method according to an embodiment of the present invention is a method for recording an image on a recording medium by ejecting the ink according to an embodiment of the present invention explained above from an ink jet recording head. Examples of the format for ejecting an ink include a format for imparting kinetic energy to an ink and a format for imparting thermal energy to an ink. In the present invention, it is specifically preferable to adopt the format for imparting thermal energy to an ink. The steps of the ink jet recording method may be known steps except that the ink according to an embodiment of the present invention is used.

Figure 2A:
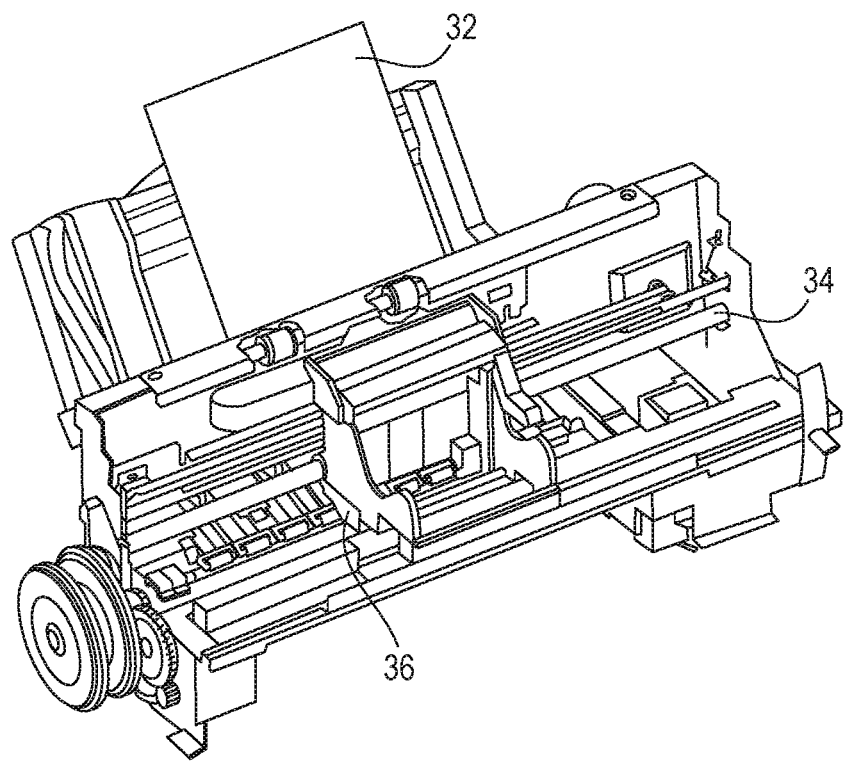
FIG. 2A is a perspective view of the major part of an ink jet recording apparatus used in the an ink jet recording method according to an embodiment of the present invention.
Figure 2B:
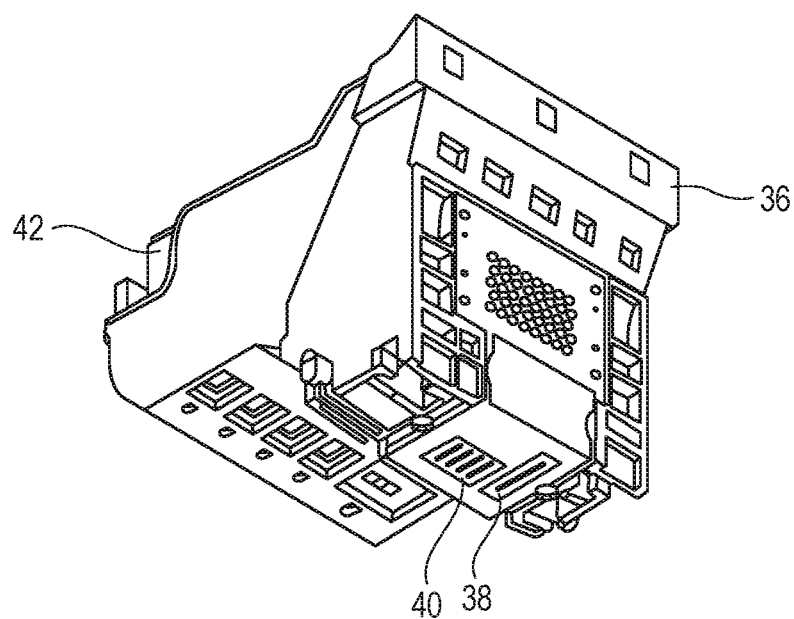
FIG. 2B is a perspective view of a head cartridge of an ink jet recording apparatus for use in an ink jet recording method according to an embodiment of the present invention.

FIG. 2A is a perspective view of the major part of an ink jet recording apparatus used in the an ink jet recording method according to an embodiment of the present invention, and FIG. 2B is a perspective view of a head cartridge of an ink jet recording apparatus for use in an ink jet recording method according to an embodiment of the present invention. In the ink jet recording apparatus, a carriage unit (not depicted) configured to carry the recording medium 32 and a carriage shaft 34 are disposed. A head cartridge 36 can be mounted on the carriage shaft 34. The head cartridge 36 includes recording heads 38 and 40 and is constituted so that the ink cartridge 42 is set. While the head cartridge 36 is carried in the primary scanning direction along the carriage shaft 34, inks (not depicted) are ejected from the recording heads 38 and 40 toward the recording medium 32. Furthermore, the recording medium 32 is carried in the secondary scanning direction by a carriage unit (not depicted), whereby an image is recorded on the recording medium 32.

According to an embodiment of the present invention, an aqueous ink having high color developing property, capable of recording an image having an excellent hue, and having excellent storage stability can be provided. Furthermore, according to another embodiment of the present invention, an ink cartridge and an ink jet recording method using this aqueous ink can be provided.

EXAMPLES

The present invention will further be explained below in detail with referring to Examples and Comparative Examples. However, the present invention is not limited by the following Examples at all as long as it does not go beyond the gist of the present invention. The descriptions "parts" and "%" with respect to the amounts of the components are based on mass unless otherwise specifically stated.

<Synthesis of Coloring Materials>

The respective coloring materials were synthesized according to the procedures mentioned below. For the sake of convenience, the respective compounds in the synthesis examples are represented as free acid forms in principle.

(Analysis Conditions)

Using water as a solvent, the maximum absorption wavelength ($\lambda_{max}$) of the obtained coloring material was measured under the following conditions.

Spectrometer: a self-recording spectrometer (trade name "U-3300", manufactured by Hitachi, Ltd.)
Measurement cell: 1 cm quartz cell
Sampling interval: 0.1 nm
Scan velocity: 30 nm/min
(Compound A)
(Step 1)

To 50.0 parts of water was added 12.2 parts of 2-amino-5-nitrobenzenesulfonic acid represented by the following Formula (a), and a 25% aqueous sodium hydroxide solution was added to adjust the pH to be 4.0 to 5.0, whereby an aqueous solution was obtained. After 18.3 parts of 35% hydrochloric acid was added, 10.5 parts of a 40% aqueous sodium nitrite solution was added and allowed to react for about 30 minutes. To this reaction product was added 1.5 parts of sulfamic acid, and the mixture was stirred for 5 minutes to give a diazo reaction liquid.

On the other hand, 11.0 parts of a compound represented by the following Formula (b) was added to 100.0 parts of water, and the pH was adjusted to 4.0 to 5.0 by adding a 25% aqueous sodium hydroxide solution to give an aqueous solution. This aqueous solution was added dropwise to the diazo reaction liquid obtained above over about 5 minutes. After the dropwise addition, a reaction was conducted for 3 hours while the pH was retained to be 4.0 to 6.0 by adding a 15% aqueous sodium carbonate solution, and sodium chloride was then added. The precipitated solid was separated by filtration, whereby 103.8 parts of a wet cake containing a compound represented by the following Formula (c) was obtained.

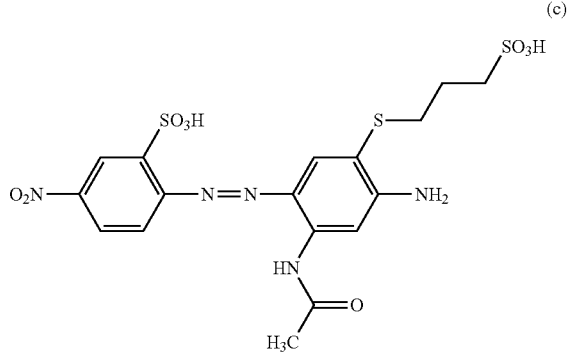

(Step 2)

The whole amount of the wet cake of the compound represented by Formula (c) obtained in Step 1 was added to 80.0 parts of water, and the pH was adjusted to 6.0 to 7.0 by adding a 25% aqueous sodium hydroxide solution to give an aqueous solution. To this aqueous solution was added 16.5 parts of 35% hydrochloric acid, and 10.6 parts of 40% aqueous sodium nitrite solution was then added and allowed to react for about 30 minutes. To this reaction product was added 7.5 parts of sulfamic acid, and the mixture was stirred for 5 minutes to give a diazo reaction liquid.

On the other hand, 64.7 parts of a wet cake of a compound represented by the following Formula (d) was added to 100.0 parts of water, and the pH was adjusted to 4.0 to 5.0 by adding a 25% aqueous sodium hydroxide solution to give an aqueous solution. This aqueous solution was added dropwise to the diazo reaction liquid obtained above over about 5 minutes. After the dropwise addition, a reaction was conducted for 3 hours while the pH was retained to be 3.0 to 3.5 by adding a 15% aqueous sodium carbonate solution. Sodium chloride was added to this solution, and the precipitated solid was separated by filtration, whereby 104.0 parts of a wet cake containing a compound represented by the following Formula (e) was obtained.

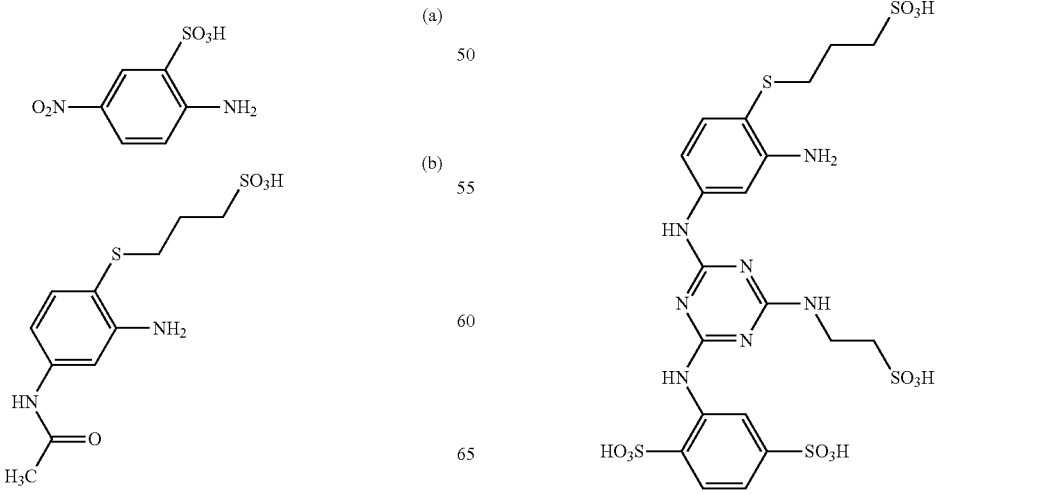

-continued

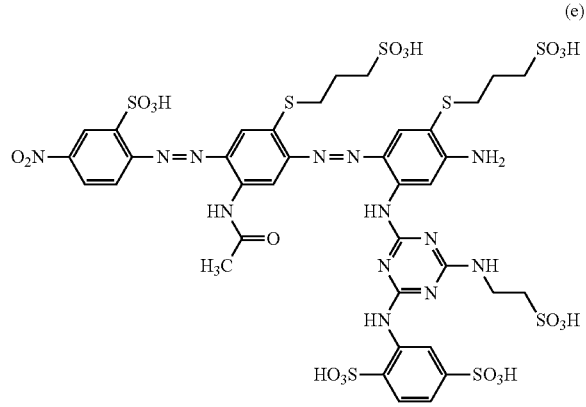
(e)

(Step 3)

The wet cake (52.0 parts) of the compound represented by Formula (e) obtained in Step 2 was added to 100.0 parts of water, and dissolved by stirring. After addition of 7.8 parts of 35% hydrochloric acid, 2.8 parts of a 40% aqueous sodium nitrite solution was added, and the mixture was stirred for about 30 minutes. Sulfamic acid (0.8 parts) was added thereto, and the mixture was stirred for 5 minutes to give a diazo reaction liquid.

On the other hand, 3.7 parts of a compound represented by the following Formula (f) was added to 80.0 parts of water, and the pH was adjusted to 6.0 to 7.0 by adding a 25% aqueous sodium hydroxide solution to give an aqueous solution. This aqueous solution was added dropwise to the diazo reaction liquid obtained above over about 5 minutes. After the dropwise addition, a reaction was conducted for 3 hours while the pH was retained to be 3.0 to 4.5 by adding a 15% aqueous sodium carbonate solution. The pH was adjusted to 7.0 to 7.5 by adding a 25% aqueous sodium hydroxide solution, and sodium chloride was added. The precipitated solid was separated by filtration, whereby 29.5 parts of a wet cake containing a compound represented by the following Formula (g) was obtained.

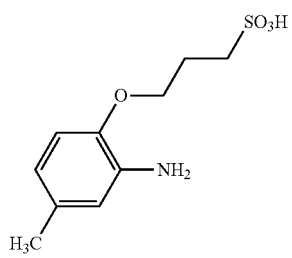
(f)

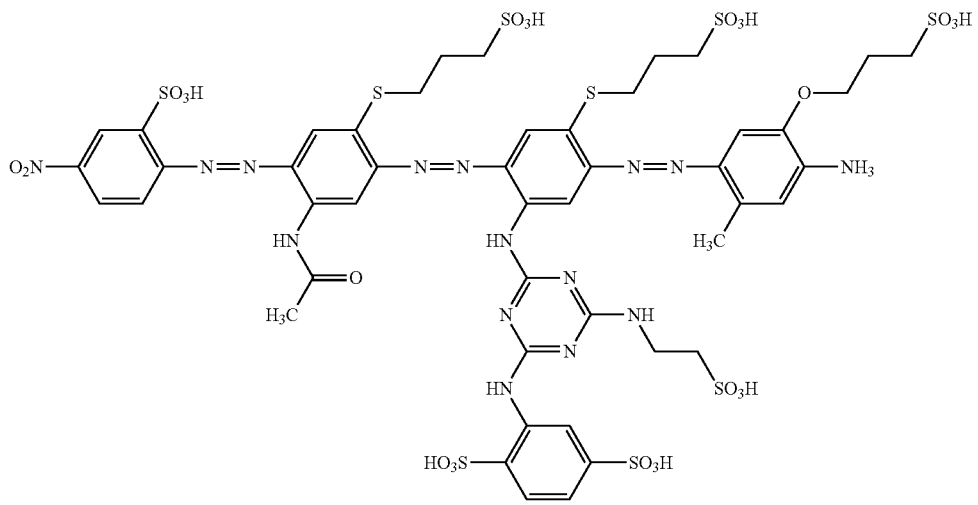
(g)

(Step 4)

The wet cake (29.5 parts) of the compound represented by Formula (g) obtained in Step 3 was added to 80.0 parts of water, and dissolved by stirring. After addition of 35% hydrochloric acid (6.3 parts), 2.3 parts of a 40% aqueous sodium nitrite solution was added, and the mixture was stirred for about 30 minutes. Sulfamic acid (0.5 parts) was then added thereto, and the mixture was stirred for 5 minutes to give a diazo reaction liquid.

On the other hand, 4.4 parts of a compound represented by the following Formula (h) obtained by the method described in International Publication No. 2007/077931 was added to 80.0 parts of water, and the pH was adjusted to 6.0 to 7.0 by adding a 5% aqueous sodium hydroxide solution to give an aqueous solution. To this aqueous solution was added dropwise the diazo reaction liquid obtained above at 15 to 30° C. over about 30 minutes. At this time, a 15% aqueous sodium carbonate solution was added to retain the pH of the reaction liquid to 6.5 to 7.5, and a reaction was conducted for further 2 hours while maintaining the same temperature and the pH adjustment. Sodium chloride was added to the reaction liquid to cause salting-out, and the precipitated solid was separated by filtration to give 21.5 parts of a wet cake. The obtained wet cake was dissolved in 40.0 parts of water, the pH was adjusted to 7.0 to 7.5 by 35% hydrochloric acid, 400.0 parts of methanol was then added, and the precipitated solid was separated by filtration. The obtained wet cake was dissolved again in 40.0 parts of water, and 300.0 parts of methanol was then added. The precipitated solid was separated by filtration and dried to give 12.1 parts of a sodium salt of a compound represented by the following Formula (A) (referred to as "Compound A") as a free acid form as a black powder. The maximum absorption wavelength $\lambda_{max}$ of the absorption spectrum of the obtained Compound A was 597 nm.

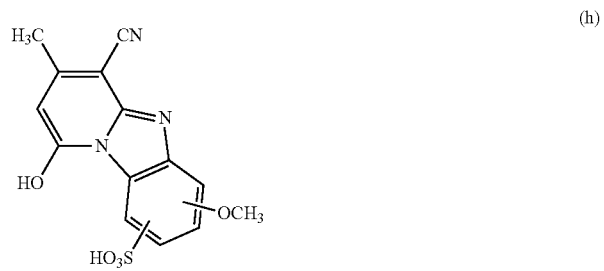

(h)

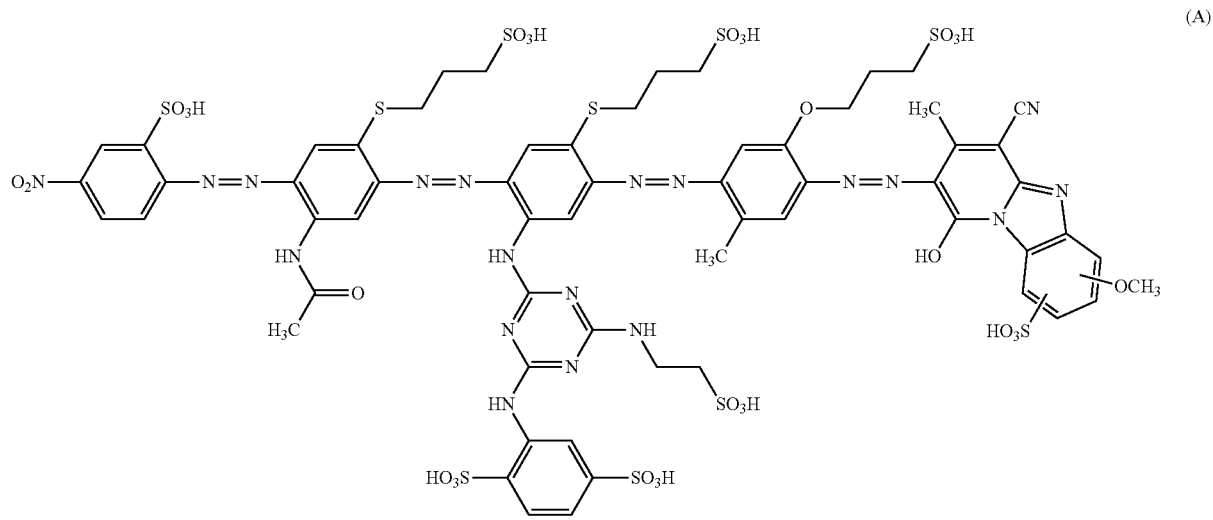

(A)

(Compound B)

A compound represented by the following Formula (B) (referred to as "Compound B") as a free acid form was obtained as a sodium salt, by suitably changing the raw materials in the synthesis example of Compound A.

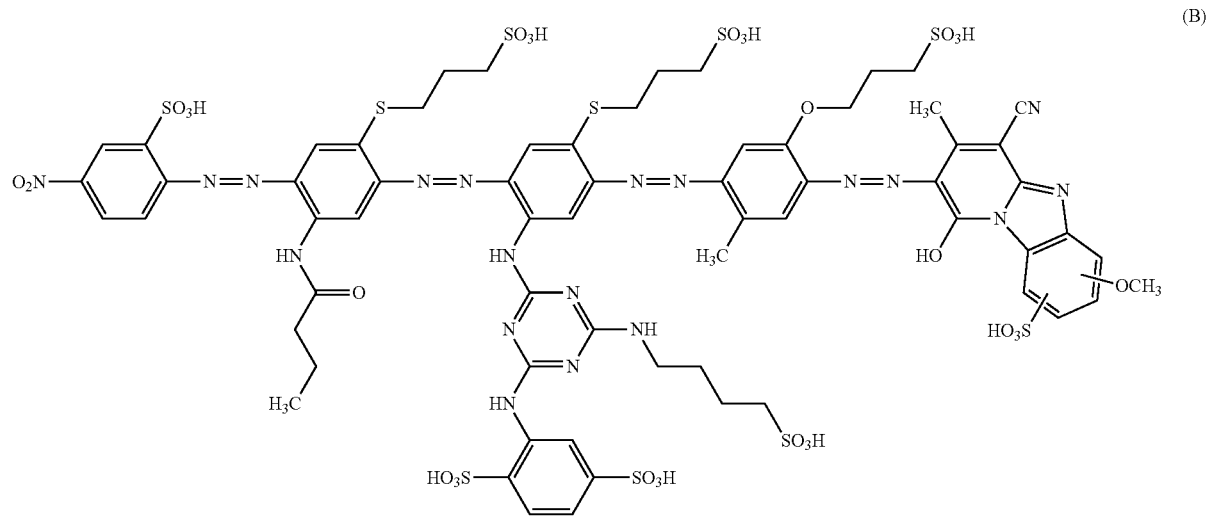

(Compound C)

A compound represented by the following Formula (C) (referred to as "Compound C") as a free acid form was obtained as a sodium salt, by suitably changing the raw materials in the synthesis example of Compound A.

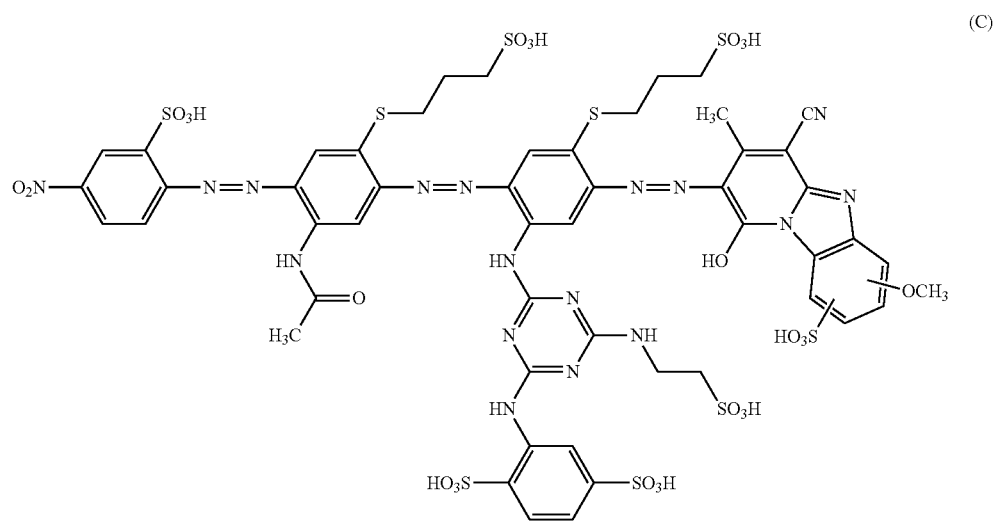

(Compound D)

A compound represented by the following Formula (D) (referred to as "Compound D") as a free acid form was obtained as a sodium salt, with referring to the description in International Publication No. WO2007/077931.

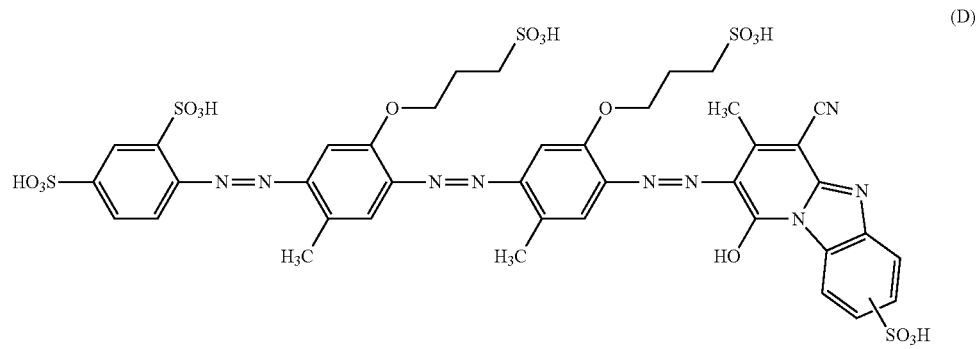

(D)

(Compound E)

A compound represented by the following Formula (E) (referred to as "Compound E") as a free acid form was obtained as a sodium salt, with referring to the description in International Publication No. WO2012/081640.

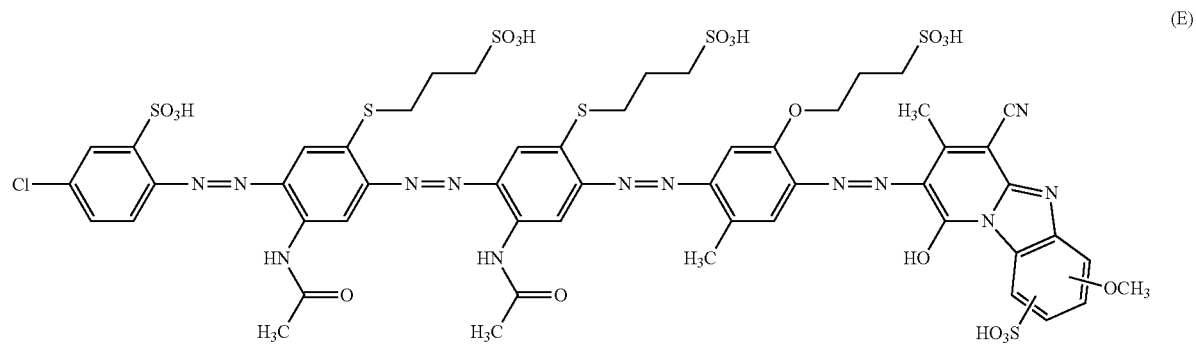

(E)

(Compound F)

A compound represented by the following Formula (F) (referred to as "Compound F") as a free acid form was obtained as a sodium salt, with referring to the description in Japanese Patent Application Laid-Open No. H03-294366.

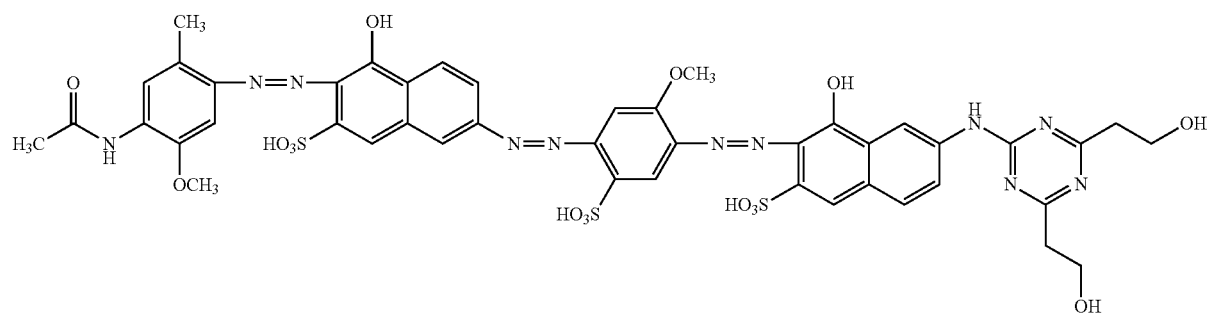

(F)

(Compound G)

A compound represented by the following Formula (G) (referred to as "Compound G") as a free acid form was obtained as a sodium salt, with referring to the description in Japanese Patent Laid-Open No. H07-150088.

(G)

[Structural formula of Compound G - a complex azo dye with naphthalene, triazine rings, and multiple substituents including COOH, CH₃, NH, OC₂H₅, OH, SO₃H, HO₃S, HOOC groups]

(Compound H)
A compound represented by the following Formula (H) (referred to as "Compound H") as a free acid form was obtained as a sodium salt, with referring to the description in Japanese Patent Application Laid-Open No. 2002-275380.

(H)

[Structural formula of Compound H - containing naphthalene rings with HO₃S, OH, OCH₃, SO₃H groups and a triazine ring linked to aniline sulfonic acid groups]

<Preparation of Ink>
The respective components (unit: %) indicated in the upper columns of Tables 6-1 to 6-4 were mixed, sufficiently stirred, and subjected to pressurization filtration by a filter with a pore size of 0.20 m to prepare respective inks. "Acetylenol E100" (manufactured by Kawaken Fine Chemicals Co., Ltd.) in Tables 6-1 to 6-4 is a trade name of a nonionic surfactant. The content S (%) of the first water-soluble organic solvent, the content C (%) of the coloring material in the ink, and the value of S/C are indicated in the lower columns of Tables 6-1 to 6-4. The numerical value for each polyethylene glycol in Tables 6-1 to 6-4 represents the number average molecular weight of the polyethylene glycol. Furthermore, the numerical value in the brackets for each water-soluble organic solvent represents the Log P value of the solvent.

TABLE 6

Compositions and Characteristics of Inks

| | Examples | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Compound A | 2.0 | 2.0 | 2.0 | 2.0 | 2.0 | 2.0 | 2.0 | 2.0 | 2.0 | 2.0 | | | 2.0 | 2.0 | 2.0 | | |
| Compound B | | | | | | | | | | | 2.0 | | | | | 2.0 | |
| Compound C | | | | | | | | | | | | 2.0 | | | | | 2.0 |
| Compound D | | | | | | | | | | | | | | | | | |
| Compound E | | | | | | | | | | | | | | | | | |
| Compound F | | | | | | | | | | | | | | | | | |
| Compound G | | | | | | | | | | | | | | | | | |
| Compound H | | | | | | | | | | | | | | | | | |
| Polyethylene glycol 400 (−2.82) | | | | | | | | | | | | | | | | | |
| Polyethylene glycol 200 (−1.88) | | | | | | | | 10.0 | | | | | | | | | |

TABLE 6-continued

Compositions and Characteristics of Inks

| | | | | | | | | | | | | | | | | | |
|---|---|---|---|---|---|---|---|---|---|---|---|---|---|---|---|---|---|
| Tetraethylene glycol (−1.88) | | 10.0 | | | | | | | | | | | | | | | |
| Bis(2-hydroxyethyl)sulfone (−1.86) | 15.0 | 15.0 | 15.0 | 15.0 | 15.0 | 15.0 | 15.0 | 15.0 | 5.0 | 15.0 | 15.0 | 15.0 | 15.0 | 15.0 | | | |
| Glycerin (−1.85) | | | 5.0 | | | | | | | | | | | | | 15.0 | 15.0 |
| Urea (−1.66) | | | | | | | | | | | | | | | | | |
| Triethylene glycol (−1.65) | 10.0 | | | 10.0 | 10.0 | 10.0 | | | 5.0 | 5.0 | 45.0 | 10.0 | 10.0 | | 10.0 | | |
| Diethylene glycol (−1.41) | | | | | | | 10.0 | | | | | | | | | | |
| ethylene glycol (−1.36) | | | | | | | | | | | | | | 10.0 | | | |
| 1,3-Propanediol (−1.09) | | | | | | | | | 5.0 | | | | | | | | |
| 2-Pyrrolidone (−1.09) | | | | 5.0 | | | | | | | | | | | | | |
| 1,5-Pentanediol (−0.56) | | | | | 5.0 | | | | | | | | | | | | |
| N-methyl-2-pyrrolidone (−0.64) | | | | | | | | | | | | | | | | | |
| Diethylene glycol monobutyl ether (0.60) | | | | | | | | | | | | | | | | | |
| Isopropanol (0.18) | | | | | | | | | | | | | | | | | |
| Acetylenol E100 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| Ion-exchanged water | 72.8 | 72.8 | 67.8 | 67.8 | 67.8 | 72.8 | 72.8 | 72.8 | 87.8 | 37.8 | 72.8 | 72.8 | 72.8 | 72.8 | 82.8 | 87.8 | 82.8 | 82.8 |
| Content of coloring material C (%) | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Content of first water-soluble organic solvent S (%) | 25.0 | 25.0 | 30.0 | 25.0 | 25.0 | 25.0 | 25.0 | 25.0 | 10.0 | 60.0 | 25.0 | 25.0 | 25.0 | 15.0 | 10.0 | 15.0 | 15.0 |
| Value of S/C (times) | 12.5 | 12.5 | 15.0 | 12.5 | 12.5 | 12.5 | 12.5 | 12.5 | 5.0 | 30.0 | 12.5 | 12.5 | 12.5 | 7.5 | 5.0 | 7.5 | 7.5 |

| | Comparative Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Compound A | 2.0 | 2.0 | 2.0 | 2.0 | 2.0 | 2.0 | 2.0 | | | | | | 1.5 |
| Compound B | | | | | | | | | | | | | |
| Compound C | | | | | | | | | | | | | |
| Compound D | | | | | | | | 2.0 | | | | | |
| Compound E | | | | | | | | | 2.0 | | | | |
| Compound F | | | | | | | | | | 2.0 | | | |
| Compound G | | | | | | | | | | | 2.0 | | |
| Compound H | | | | | | | | | | | | 2.0 | |
| Polyethylene glycol 400 (−2.82) | | | | 25.0 | | | | | | | | | |
| Polyethylene glycol 200 (−1.88) | | | | | | | | | | | | | |
| Tetraethylene glycol (−1.88) | | | | | | | | | | | | | |
| Bis(2-hydroxyethyl)sulfone (−1.86) | | | | | | 5.0 | 31.0 | 15.0 | 15.0 | 15.0 | 15.0 | 15.0 | |
| Glycerin (−1.85) | | | | | | | | | | | | | 5.0 |
| Urea (−1.66) | | 25.0 | | | | | | | | | | | 5.0 |
| Triethylene glycol (−1.65) | | | | | | 4.0 | 30.0 | 10.0 | 10.0 | 10.0 | 10.0 | 10.0 | |
| Diethylene glycol (−1.41) | | | | | | | | | | | | | |
| ethylene glycol (−1.36) | | | | | | | | | | | | | |
| 1,3-Propanediol (−1.09) | | | | | | | | | | | | | |
| 2-Pyrrolidone (−1.09) | | | | | | | | | | | | | |
| 1,5-Pentanediol (−0.56) | | | | | 25.0 | | | | | | | | |
| N-methyl-2-pyrrolidone (−0.64) | | | 25.0 | | | | | | | | | | 4.0 |
| Diethylene glycol monobutyl ether (0.60) | | | | 15.0 | | | | | | | | | 2.0 |
| Isopropanol (0.18) | | | | | | | | | | | | | 3.0 |
| Acetylenol E100 | 0.2 | 0.2 | 0.2 | 0.2 | 0.2 | 0.2 | 0.2 | 0.2 | 0.2 | 0.2 | 0.2 | 0.2 | 0.2 |
| Ion-exchanged water | 72.8 | 72.8 | 82.8 | 72.8 | 72.8 | 88.8 | 36.8 | 72.8 | 72.8 | 72.8 | 72.8 | 72.8 | 79.3 |
| Content of coloring material C (%) | 2.0 | 2.0 | 2.0 | 2.0 | 2.0 | 2.0 | 2.0 | 2.0 | 2.0 | 2.0 | 2.0 | 2.0 | 1.5 |
| Content of first water-soluble organic solvent S (%) | 0.0 | 0.0 | 0.0 | 0.0 | 0.0 | 9.0 | 61.0 | 25.0 | 25.0 | 25.0 | 25.0 | 25.0 | 5.0 |
| Value of S/C (times) | 0.0 | 0.0 | 0.0 | 0.0 | 0.0 | 4.5 | 30.5 | 12.5 | 12.5 | 12.5 | 12.5 | 12.5 | 3.3 |

<Evaluation>

Each of the inks obtained above was filled in an ink cartridge, and installed in an ink jet recording apparatus (trade name "PIXUS iP8600", manufactured by CANON Inc.), which is configured to eject an ink from a recording head by the action of thermal energy. In these Examples, a solid image recorded by imparting 2.5 pL of an ink to a unit area of 1/2400 inch×1/1200 inch is defined as "having a recording duty of 100%". An image having a recording duty of 100% was recorded on glossy paper (trade name "CANON photographic paper Glossy Pro [Platinum Grade] PT201", manufactured by CANON Inc.) under conditions of a temperature of 23° C. and a relative humidity of 55%. During the evaluation of an optical density and a hue, the optical density was measured by using a spectrometer (trade name "Spectrolino", manufactured by Gretag Macbeth) under conditions of a light source: D50 and a visual field: 20°. a* is a* in the L*a*b* color system defined by CIE (Commission Internationale de l'Éclairage). In the present invention, in the evaluation criteria of the following respective items, "A" and "B" represent acceptable levels, and "C" represents an unacceptable level. The evaluation results are shown in Table 7.

(Color Developing Property)

The optical density of a solid image was measured, and the color developing property was evaluated according to the evaluation criteria shown below.

A: The optical density was 1.45 or more.
B: The optical density was 1.35 or more to lower than 1.45.
C: The optical density was lower than 1.35.

(Hue)

The a* of the solid image was measured, and the hue was evaluated according to the evaluation criteria shown below. A smaller a* represents a neutral black hue having a more greenish hue than that of conventional inks.

AA: a* was lower than 0.0.
A: a* was 0.0 or more to lower than 1.0.
B: a* was 1.0 or more to lower than 3.0.
C: a* was 3.0 or more.

(Storage Stability)

For each of the inks obtained above, the absorbance at the maximum absorption wavelength of the coloring material in a UV-Vis light absorption spectrum was measured (the absorbance before storage). This ink was put into a sealable container, stored under an environment at a temperature of 70° C. for 14 days, and the absorbance was then measured in a similar manner (the absorbance after storage). The UV-Vis light absorption spectrum was measured by using a spectrometer (trade name "U-3300", manufactured by Hitachi, Ltd.). From the obtained values of the absorbances, a decrease rate of absorbance=(absorbance before storage−absorbance after storage)/(absorbance before storage)× 100% was calculated, and the storage stability was evaluated according to the evaluation criteria shown below. A smaller decrease rate of absorbance represents that the state of solution of the coloring material is retained more stably.

A: The decrease rate of absorbance was lower than 15%.
B: The decrease rate of absorbance was 15% or more to lower than 20%.
C: The decrease rate of absorbance was 20% or more.

TABLE 7

Results of Evaluations

| | | Color developing property | Hue | Storage stability |
|---|---|---|---|---|
| Examples | 1 | A | AA | A |
| | 2 | A | AA | A |
| | 3 | A | AA | A |
| | 4 | A | AA | A |
| | 5 | A | AA | A |
| | 6 | A | AA | A |
| | 7 | A | AA | A |
| | 8 | A | AA | A |
| | 9 | A | AA | A |
| | 10 | A | AA | A |
| | 11 | A | AA | B |
| | 12 | A | A | B |
| | 13 | A | A | A |
| | 14 | A | A | A |
| | 15 | B | AA | A |
| | 16 | B | A | B |
| | 17 | B | B | B |
| Comparative Examples | 1 | B | A | C |
| | 2 | C | A | C |
| | 3 | C | A | C |
| | 4 | C | A | A |
| | 5 | C | A | A |
| | 6 | A | AA | C |
| | 7 | C | AA | A |
| | 8 | C | C | A |
| | 9 | B | C | A |
| | 10 | C | A | B |
| | 11 | C | A | B |
| | 12 | C | C | B |
| | 13 | B | A | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-058409, filed Mar. 24, 2017, and Japanese Patent Application No. 2018-022727, filed Feb. 13, 2018, which are hereby incorporated by reference herein in their entirety.

What is claimed is:

1. An aqueous ink for ink jet comprising a coloring material and a water-soluble organic solvent,
   wherein the coloring material is a compound represented by the following General Formula (1),
   wherein the water-soluble organic solvent comprises a first water-soluble organic solvent having two or more hydroxy groups and having a Log P value of −1.88 or more to −1.09 or less, and
   wherein the content (mass %) of the first water-soluble organic solvent is 5.0 times or more to 30.0 times or less by a mass ratio with respect to the content (mass %) of the coloring material:

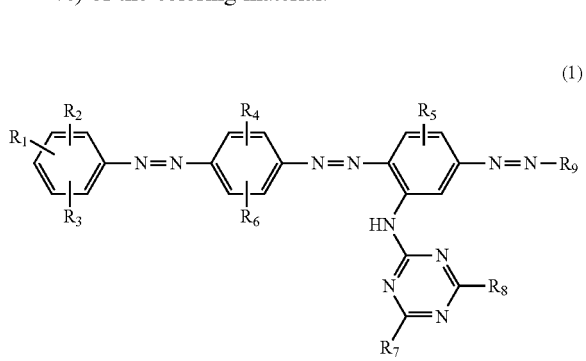

(1)

wherein, in General Formula (1),
   $R_1$, $R_2$ and $R_3$ each independently represent a hydrogen atom; a carboxylic acid group; a sulfonic acid group; a hydroxy group; an acetylamino group; a halogen atom; a cyano group; a nitro group; a sulfamoyl group; an alkyl group having 1 to 4 carbon atom(s); an alkoxy group having 1 to 4 carbon atom(s); an alkoxy group having 1 to 4 carbon atom(s) substituted by at least one kind of group(s) selected from the group consisting of a hydroxy group, an alkoxy group having 1 to 4 carbon atom(s), a sulfonic acid group, and a carboxylic acid group; an alkylsulfonyl group having 1 to 4 carbon atom(s); or an alkylsulfonyl group having 1 to 4 carbon atom(s) substituted by at least one kind of group(s) selected from the group consisting of a hydroxy group, a sulfonic acid group, and a carboxylic acid group;

$R_4$ and $R_5$ each independently represent an alkylthio group having 1 to 4 carbon atom(s); an alkylthio group having 1 to 4 carbon atom(s) substituted by at least one kind of group(s) selected from the group consisting of a hydroxy group, a sulfonic acid group, and a carboxylic acid group; an alkoxy group having 1 to 4 carbon atom(s); or an alkoxy group having 1 to 4 carbon atom(s) substituted by at least one kind of group(s) selected from the group consisting of a hydroxy group, a sulfonic acid group, and a carboxylic acid group;

$R_6$ represents a hydrogen atom; a carboxylic acid group; a sulfonic acid group; an alkylcarbonylamino group having 1 to 4 carbon atom(s); a halogen atom; an alkyl group having 1 to 4 carbon atom(s); an alkoxy group having 1 to 4 carbon atom(s); or an alkoxy group having 1 to 4 carbon atom(s) substituted by at least one kind of group(s) selected from the group consisting of a hydroxy group, an alkoxy group having 1 to 4 carbon atom(s), a sulfonic acid group, and a carboxylic acid group;

$R_7$ represents an anilino group substituted with a sulfonic acid group or a naphthylamino group substituted with a sulfonic acid group, and $R_7$ may further have at least one kind of substituent(s) selected from the group consisting of: a sulfonic acid group; a carboxylic acid group; a phosphoric acid group; a sulfamoyl group; a carbamoyl group; a hydroxy group; an alkoxy group having 1 to 6 carbon atom(s); an amino group; a mono- or di-alkylamino group having 1 to 6 carbon atom(s); a mono- or di-arylamino group; an acetylamino group; an ureido group; an alkyl group having 1 to 6 carbon atom(s); a nitro group; a cyano group; a halogen atom; an alkylsulfonyl group having 1 to 6 carbon atom(s); and an alkylthio group having 1 to 6 carbon atom(s);

$R_8$ represents an anilino group; a naphthylamino group; a mono- or di-alkylamino group having 1 to 6 carbon atom(s); a mono- or di-arylamino group; an amino group; an alkylthio group having 1 to 6 carbon atom(s); a phenylthio group; a phenoxy group; an alkoxy group having 1 to 6 carbon atom(s); or a hydroxy group; and $R_8$ may further have at least one kind of substituent(s) selected from the group consisting of: a sulfonic acid group; a carboxylic acid group; a phosphoric acid group; a sulfamoyl group; a carbamoyl group; a hydroxy group; an alkoxy group having 1 to 6 carbon atom(s); an amino group; a mono- or di-alkylamino group having 1 to 6 carbon atom(s); a mono- or di-arylamino group; an acetylamino group; an ureido group; an alkyl group having 1 to 6 carbon atom(s); a nitro group; a phenyl group; a furyl group; a pyridyl group; a cyano group; a halogen atom; an alkylsulfonyl group having 1 to 6 carbon atom(s); and an alkylthio group having 1 to 6 carbon atom(s); and $R_9$ represents a heterocyclic aromatic ring, or an aromatic ring to which a heterocyclic aromatic ring is bonded via an azo group, and these rings may have at least one kind of substituent(s) selected from the group consisting of: an alkyl group having 1 to 4 carbon atom(s); a sulfonic acid group; a carboxylic acid group; a phosphoric acid group; a sulfamoyl group; a carbamoyl group; a hydroxy group; an alkoxy group having 1 to 4 carbon atom(s); an alkoxy group having 1 to 4 carbon atom(s) substituted with a sulfonic acid group; a cyano group; an amino group; and an alkylcarbonylamino group having 1 to 4 carbon atom(s).

2. The aqueous ink according to claim 1, wherein the compound represented by General Formula (1) is a compound represented by the following General Formula (2):

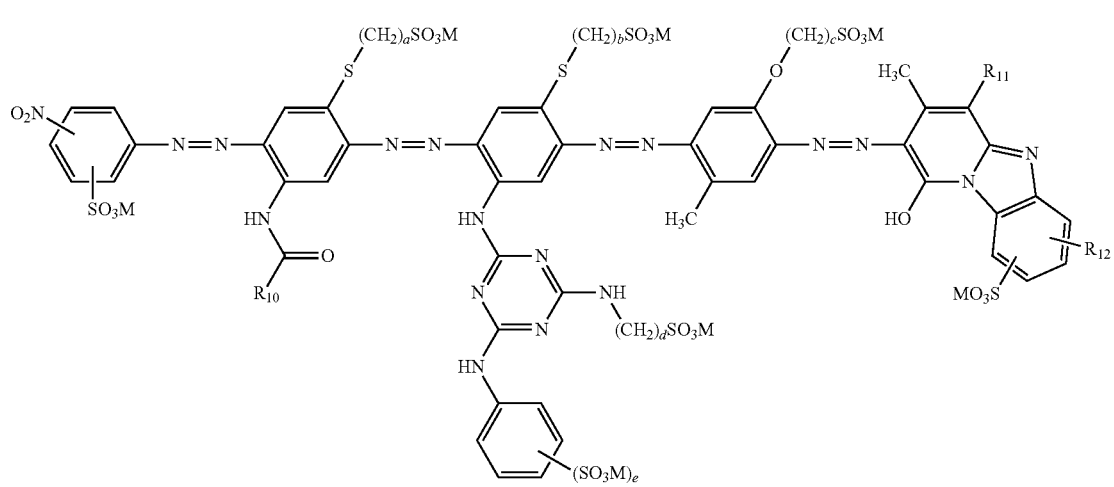

(2)

wherein, in General Formula (2), $R_{10}$ represents an alkyl group having 1 to 4 carbon atom(s);

$R_{11}$ represents a carbamoyl group, a cyano group, an amino group, or an alkylcarbonylamino group having 1 to 4 carbon atom(s);

$R_{12}$ represents a hydrogen atom or an alkoxy group having 1 to 4 carbon atom(s);

Ms each independently represent a hydrogen atom, an alkali metal, an ammonium, or an organic ammonium;

a, b, c and d each independently represent an integer of 1 or more to 4 or less; and e represents 1 or 2.

3. The aqueous ink according to claim 2, wherein the compound represented by General Formula (2) is a compound represented by the following General Formula (3):

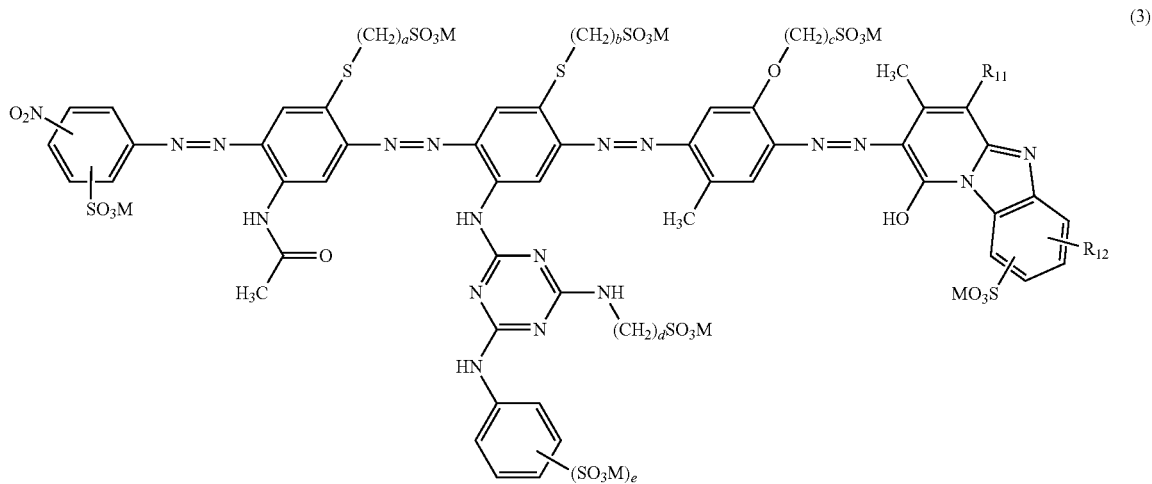

(3)

wherein, in General Formula (3),
- $R_{11}$ represents a carbamoyl group, a cyano group, an amino group, or an alkylcarbonylamino group having 1 to 4 carbon atom(s);
- $R_{12}$ represents a hydrogen atom or an alkoxy group having 1 to 4 carbon atom(s);
- Ms each independently represent a hydrogen atom, an alkali metal, an ammonium, or an organic ammonium;
- a, b, c and d each independently represent an integer of 1 or more to 4 or less; and
- e represents 1 or 2.

4. The aqueous ink according to claim 1, wherein the first water-soluble organic solvent comprises at least one kind selected from the group consisting of a polyethylene glycol having a number average molecular weight of 200, tetraethylene glycol, triethylene glycol, and diethylene glycol.

5. The aqueous ink according to claim 1, wherein the first water-soluble organic solvent comprises bis(2-hydroxyethyl)sulfone.

6. An ink cartridge comprising:
an ink, and
an ink storage portion configured to house the ink,
wherein the ink comprises the aqueous ink according to claim 1.

7. An ink jet recording method comprising:
ejecting an ink from an ink jet recording head; and
recording an image on a recording medium,
wherein the ink comprises the aqueous ink according to claim 1.

* * * * *